(12) United States Patent
Williams et al.

(10) Patent No.: US 9,215,489 B2
(45) Date of Patent: Dec. 15, 2015

(54) CUSTOM ELECTRONIC PROGRAM GUIDES

(71) Applicants: Maini Williams, Tampa, FL (US); Heli Margit Järventie-Ahonen, Tampere (FI)

(72) Inventors: Maini Williams, Tampa, FL (US); Heli Margit Järventie-Ahonen, Tampere (FI)

(73) Assignee: The Nielson Company (US), LLC, New York, NY (US)

( * ) Notice: Subject to any disclaimer, the term of this patent is extended or adjusted under 35 U.S.C. 154(b) by 0 days.

(21) Appl. No.: 13/691,302

(22) Filed: Nov. 30, 2012

(65) Prior Publication Data

US 2014/0157312 A1    Jun. 5, 2014

(51) Int. Cl.
| | |
|---|---|
| G06F 3/00 | (2006.01) |
| G06F 13/00 | (2006.01) |
| H04N 5/445 | (2011.01) |
| H04H 60/32 | (2008.01) |
| H04N 7/16 | (2011.01) |
| H04N 21/41 | (2011.01) |
| H04N 21/466 | (2011.01) |
| H04N 21/472 | (2011.01) |

(52) U.S. Cl.
CPC ....... *H04N 21/4126* (2013.01); *H04N 21/4667* (2013.01); *H04N 21/4668* (2013.01); *H04N 21/47214* (2013.01)

(58) Field of Classification Search
USPC .................................. 725/18, 19, 25, 30, 39
See application file for complete search history.

(56) References Cited

U.S. PATENT DOCUMENTS

| | | |
|---|---|---|
| 5,351,075 A | 9/1994 | Herz et al. |
| 5,758,259 A | 5/1998 | Lawler |
| 5,793,438 A | 8/1998 | Bedard |
| 5,801,747 A * | 9/1998 | Bedard ........................... 725/46 |
| 5,867,226 A | 2/1999 | Wehmeyer et al. |
| 6,490,724 B1 | 12/2002 | Ha et al. |
| 6,813,775 B1 | 11/2004 | Finseth et al. |
| 7,188,355 B1 | 3/2007 | Prokopenko et al. |
| 7,370,342 B2 | 5/2008 | Ismail et al. |
| 7,634,790 B2 | 12/2009 | Finseth et al. |

(Continued)

FOREIGN PATENT DOCUMENTS

| | | |
|---|---|---|
| WO | 0147257 A1 | 6/2001 |
| WO | 0147273 A1 | 6/2001 |

OTHER PUBLICATIONS

A. Mufit Ferman et al., "Multimedia Content Recommendation Engine with Automatic Inference of User Preferences", 2003, pp. 1-4, Sharp Laboratories of America, Inc., Camas, WA, USA.

*Primary Examiner* — Pinkal R Chokshi
*Assistant Examiner* — Alexander Gee
(74) *Attorney, Agent, or Firm* — Hanley, Flight & Zimmerman, LLC

(57) ABSTRACT

Custom electronic program guides are disclosed. An example method includes collecting identifying information associated with media using at least one of a microphone or camera of a consumer electronics device, determining a characteristic of the consumer electronics device, the characteristic being at least one of a length of time during which the identifying information was collected, a percentage of the identifying information corresponding to a same program, or a geographic location at which the identifying information was collected, and determining, based on the characteristic, whether the collected identifying information is to be used in generating a custom electronic program guide for a user associated with the consumer electronics device.

39 Claims, 19 Drawing Sheets

(56) References Cited

U.S. PATENT DOCUMENTS

| | | |
|---|---|---|
| 7,779,439 B2 | 8/2010 | Sie et al. |
| 8,171,515 B2 | 5/2012 | Schwesinger et al. |
| 2005/0160458 A1 | 7/2005 | Baumgartner |
| 2006/0123448 A1* | 6/2006 | Ma et al. .......................... 725/51 |
| 2008/0098433 A1 | 4/2008 | Hardacker et al. |
| 2009/0119695 A1* | 5/2009 | Ramaswamy et al. .......... 725/13 |
| 2009/0187932 A1* | 7/2009 | Rathburn et al. ................. 725/9 |
| 2009/0300669 A1* | 12/2009 | Wright et al. ................... 725/10 |
| 2009/0307719 A1 | 12/2009 | Clark et al. |
| 2010/0058390 A1 | 3/2010 | Harris et al. |
| 2010/0146546 A1* | 6/2010 | Nishimura et al. ............. 725/39 |
| 2011/0088053 A1* | 4/2011 | Lee ................................. 725/19 |
| 2011/0145849 A1 | 6/2011 | Ng et al. |
| 2011/0320482 A1 | 12/2011 | Barbieri et al. |
| 2013/0104170 A1* | 4/2013 | Su ................................... 725/40 |

* cited by examiner

CUSTOM ELECTRONIC PROGRAM GUIDES

FIELD OF THE DISCLOSURE

This disclosure relates generally to media, and, more particularly, to custom electronic program guides.

BACKGROUND

Media delivery systems typically provide information to users regarding media to be delivered to devices associated with the users. In some instances, media delivery systems convey information (e.g., presentation times, descriptions, parental rating guides (PG, R, etc.), etc.) regarding upcoming programming via a program guide. Program guides typically include (e.g., in a grid) a list of channels and corresponding media to be provided via the channels at different times. Such a program guide may be presented to the users electronically.

Media consumers use electronic program guides to identify upcoming air times and channel locations of media (e.g., television programs, motion pictures, internet videos, radio programs, etc.) and/or to identify media of interest for immediate viewing.

DETAILED DESCRIPTION

Example methods and apparatus disclosed herein are used to collect media identifying information indicative of media presented by a consumer electronics device (e.g., a mobile device (e.g., a cellular phone, smart phone, personal digital assistant (PDA), tablet computer, remote control, etc.), a computer, a set top box (STB), a digital video recorder (DVR), a television, a stereo, a home automation system, etc.). The identifying information identifies media (e.g., television programming, radio programming, internet programming, etc.) and is used to generate a custom electronic program guide. Some such example methods and apparatus are implemented using portable metering technology. In some examples, the portable metering technology is implemented by a dedicated audience measurement meter. In other examples, the portable metering technology is implemented by a software meter installed on a consumer electronics device. In some examples, the consumer electronics device is portable.

In some examples, the meter collects identifying information (e.g., metadata, signatures, codes, and/or watermarks) associated with media received by a microphone, camera, and/or other sensor (e.g., optical, infrared, etc.). The received media may be presented by one or more media presentation device(s) (e.g., a television, a computer, a radio, a stereo, etc.) in proximity to the meter. Any type of media presentation device(s) may be metered. Such presentation devices may receive the media via any type of distribution medium such as, for example, cable, satellite, Internet, and/or over-the-air distribution mediums. In some examples, such as when a dedicated portable meter is employed or when a consumer electronics device having a meter is to be carried by a specific individual (e.g., a mobile phone with an installed meter), the meter is assigned to a particular audience member participating in a market research study. In such instances, the metering device stores a unique audience member identifier corresponding to its respective audience member (e.g., a participant and/or panelist number, personal name, family name, family position (e.g., father, mother, brother, etc.), a proxy assigned to a member of the monitored household, etc.).

Figure 1:
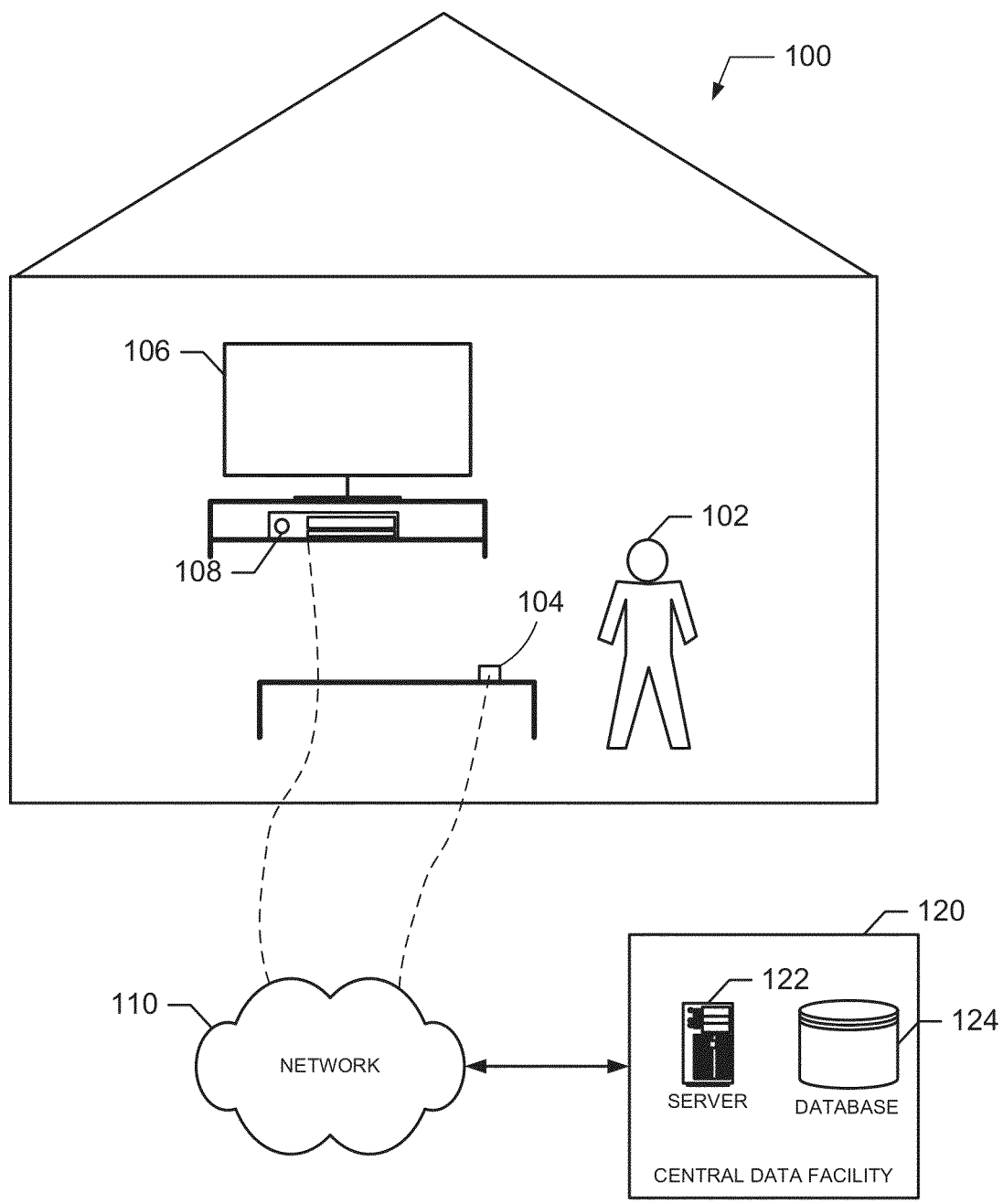
FIG. 1 illustrates an example media exposure environment in which a meter collects identification information corresponding to media presented in the environment for use in generation of a custom electronic program guide.

FIG. 1 illustrates an example media exposure environment 100 (e.g., a household 100) in which a meter 104 collects media identifying information representative of media presented in the environment 100. The example media exposure environment 100 of FIG. 1 includes a television 106 and a set-top box (STB) 108. The example environment 100 may include additional and/or alternative media presentation devices (e.g., a radio, a stereo, a personal computer, a video game console, a digital video recorder (DVR), etc.). In some examples, the meter 104 is implemented by or located within the television 106 and/or the STB 108.

In the illustrated example of FIG. 1, the meter 104, the television 106, and/or the STB 108 communicate with a central data facility 120 via a network 110 (e.g., the Internet, a wide area network (WAN), a local area network (LAN), cellular network, etc.). The central data facility 120 of the illustrated example includes a server 122 and a database 124. In the illustrated example, communication via the network 110 may be performed through wireless and/or wired communication link(s).

In the illustrated example of FIG. 1, the meter 104 receives audio and/or video presented via, for example, the television 106 and/or other media presentation device(s). In the illustrated example, the meter 104 accesses the audio and/or video of presented media to obtain media identifying information. The meter 104 may collected the identifying information using any desired techniques. For example, the media may be collected by, for example, listening for audio presented within the environment 100 with a microphone and/or by capturing images of the video presented on the presentation device(s). Alternatively, the media may be collected via a wired connection. Further, the obtained media may be examined for metadata identifying the media, may be decoded for embedded codes (e.g., watermarks), may be processed to generate a signature, etc. As used herein, a signature is a representation of some, preferably unique, portion of the media or the signal used to transport the media. As used herein a code is data added to the signal for the purpose of identifying the corresponding media and/or for another purpose such as tuning (e.g., a packet identifier used in tuning digital television). The codes may, for example, be embedded in video, in audio, or in a data stream communicated with the audio/video. In some examples the codes are embedded so as to be electronically detected but not easily detected by unaided human senses. The Nielsen NAES™ codes carried by many television programs broadcast in the United States are an example of such codes.

In some examples, the media is identified by collecting tuning information (e.g., channel numbers) and timestamps to enable cross-referencing of a broadcast program schedule. In some such examples, the tuning information is obtained by intercepting tuning commands from a remote control.

In the illustrated example of FIG. 1, the meter 104 collects identifying information using a microphone. In other examples, a camera and/or other sensor (e.g., audio, optical, infrared, etc.) is used. In the example of FIG. 1, the microphone receives audio signals which may be embedded with codes. In other examples a camera captures video and/or images which may be embedded with codes displayed on the television 106.

In the illustrated example of FIG. 1, the meter 104 periodically or aperiodically uploads the identifying information (e.g., collected signatures, codes, channel numbers, etc.) to the central data facility 120. For example, after the meter 104 collects identifying information associated with media for a certain period of time (e.g., fifteen minutes), the meter 104 sends the identifying information to the central data facility 120. In some examples, rather than storing the data for period uploads, the meter 104 continuously or substantially continuously (i.e., whenever the ability to upload is present) uploads the identifying information to the central data facility 120. For example, the meter 104 uploads the identifying information for a first program presented on a television tuned to a given channel at substantially the same time the program is presented and continues to upload identifying information associated with the tuned program(s) in substantial real time. In examples when a second program is tuned (i.e., the channel is changed), the meter 104 monitors the time of exposure for both programs until it determines that the collected identifying information (or a threshold percentage of the collected identifying information) has been associated with the second program for a certain period of time (e.g. three minutes). At that point, the meter 104 ceases to accrue time of exposure to the first program but continues to accrue the time of exposure to the second program.

In the example of FIG. 1, the example server 122 of the central data facility 120 processes the identifying information and retrieves program information associated with the identifying information from the database 124. The program information may include program schedules, program descriptions, and/or data identifying similar and/or related programs, etc. The example server 122 sends the requested program information back to the meter 104 via the network 110. In some examples, the meter 104 presents the program information on a display of the meter 104 or a media presentation device (e.g., the television 106) associated with the meter 104 each time program information associated with uploaded identifying information is received.

In some examples, the central data facility 120 provides updates to the meter 104 and/or media presentation device(s) of the media exposure environment 100 (e.g., the television 106 and/or the STB 108) via the network 110. The updates may include program information to be stored on the meter 104 and/or a consumer electronics device associated with the meter 104. In some examples, the meter 104 cross-references the identifying information to the program information (e.g., program schedules, program descriptions, program information of similar and/or related programs, etc.) stored in a storage device (e.g., program database 250) accessible by the meter 104. In some examples, the meter 104 cross-references the identifying information to the program information stored on accessible media presentation devices 106, 108 (e.g., in a DVR) via the network 110 (e.g., a LAN).

In the illustrated example of FIG. 1, the information presentation device 106 is implemented by a television, and an audience member 102 views a television program on the television 106. In this example, the television program is tuned via the STB 108. In the illustrated example, the meter 104 is implemented by software executed on a portable consumer electronics device such as a mobile phone. The consumer electronics device has multiple functions that may be accessed by a user. In the illustrated example, the audience member 102 sets the consumer electronics device 104 to a "listen" mode, during which time the meter 104 receives audio presented within the home 100 of the audience member 102 via a microphone. The consumer electronics device/meter 104 analyzes the collected audio to gather identifying information. For example, the meter 104 may collect tuning information, collect watermarks, if present, and/or generate signatures. The collected identifying information may be used to identify the media locally at the meter 104 (see U.S. Pat. No. 9,106,953) and/or the data may be exported to the central data facility 120 for media identification. Regardless of where the media identification occurs, if the same media is presented for a sufficient time period (e.g., a threshold, such as 10 minutes) the television program is potentially media to be added to a personal television guide (e.g., an electronic program guide (EPG)) for the audience member 102. In some examples the consumer electronics device/meter 104 prompts the audience member 102 for authorization to add the media to the personalized EPG through an alarm. In some examples, the meter 104 or the central data facility 120 determines a location where the exposure occurred (e.g., via a global positioning system (GPS) associated with the meter 104) and makes a determination to add or not add the media and/or to prompt or not prompt the audience member 102 for authorization to add the media to the personalized EPG based on the location.

In some examples the meter 104 sends the identifying information and a request for the program information to the central data facility 120 via the network 110. In some examples, the meter 104 sends the corresponding geographic location of the meter 104 along with the request. In some such examples, the central data facility 120 sends a response message including the program information (e.g., the program name, program schedule information, program description, program information of similar and/or related programs, etc.) via the network 110 to the meter 104. In some examples, the program information is localized based on the geographic information (e.g., limited to a schedule for local channels, related local programming, etc.). The meter 104 of the illustrated example renders the program information in a custom television program guide to be displayed to the user (e.g., via a consumer electronics device associated with the meter 104). In some examples, the meter 104 forwards the program guide data (e.g., via a Bluetooth connection, via a home network, via the network 110, etc.) to the STB 108 and/or the television 106 to be rendered and displayed on the television 106 and/or another media presentation device.

In some examples, the central data facility 120 uses the identifying information received from the meter 104 to track the programs detected by the meter 104. The server 122 of the central data facility is able to process data representative of the programs detected by the meter 104 and other similar consumer electronics devices/meters to estimate a viewing audience for the corresponding program. To this end, the meter 104 may collect audience identification information identifying persons in the environment 100. The audience identification information may be collected by the audience member to self-identify (e.g., by inputting their name or other identifier) and/or by any automatic identification methods. In examples where the meter 104 is assigned to a specific individual, all media exposure data to be credited is credited to that particular user. To support the development of exposure and/or popularity ratings, the audience members may be persons who have agreed to be monitored (e.g., panelists). Such panelists may be statistically selected to represent population (s) of interest. Panelists provide accurate and detailed demographic information during a registration process conducted by an audience measurement entity and/or a panelist recruitment entity which enables projecting the media exposure behavior of the panelist(s) to one or more populations (e.g., demographic segments) of interest.

Figure 2:
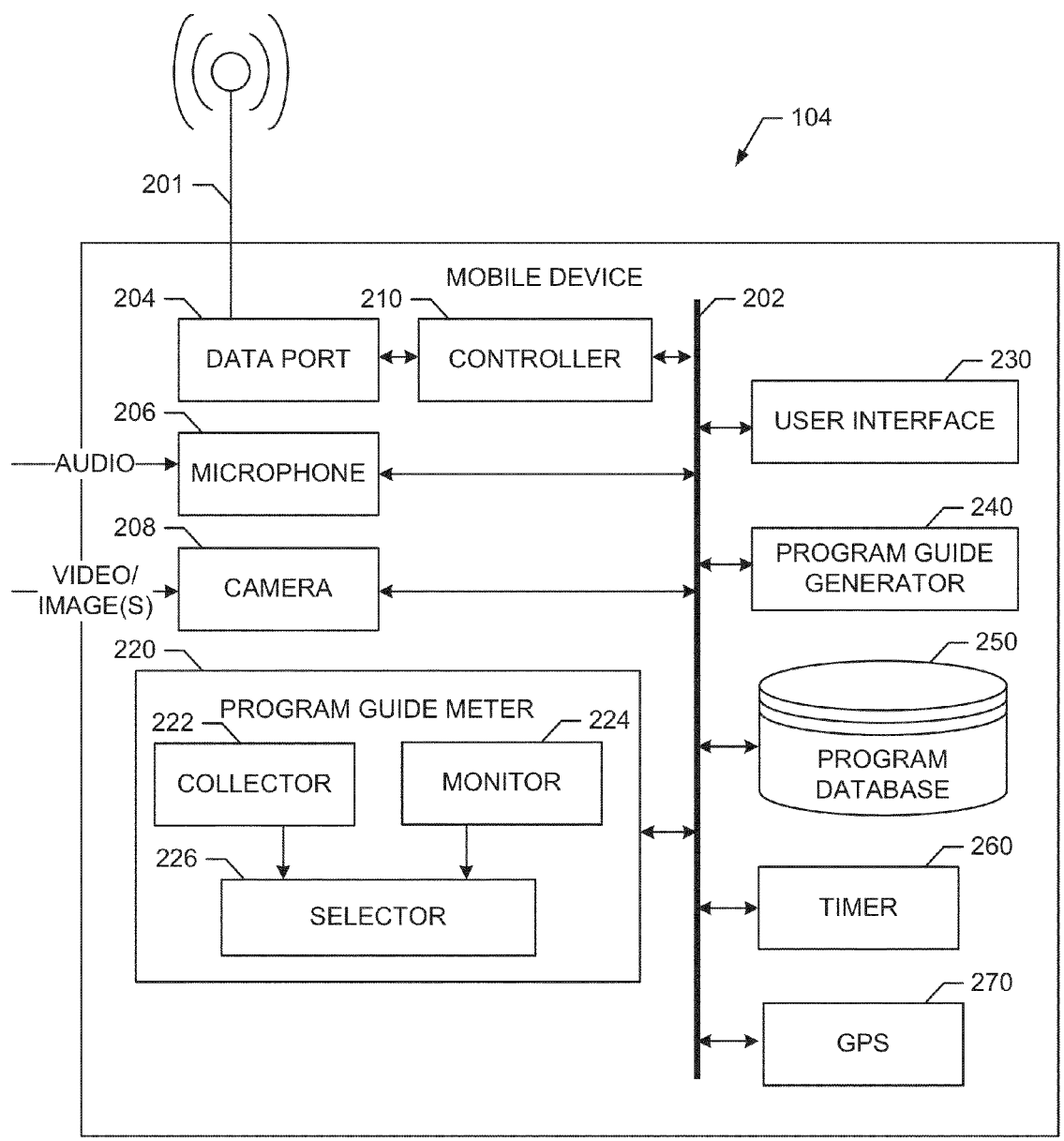
FIG. 2 is a block diagram of an example implementation of the example meter depicted in FIG. 1.

FIG. 2 illustrates an example electronics consumer electronics device 104 that may be used to implement the example meter 104 of FIG. 1. In the illustrated example of FIG. 2, the example consumer electronics device 104 includes an example antenna 201, an example data port 204, an example microphone 206, an example camera 208, an example controller 210, an example program guide meter 220, an example user interface 230, an example program guide generator 240, an example program database 250, an example timer 260, and an example global positioning system (GPS) receiver 270. Other functionality native to the consumer electronics device 104 may additionally be included. An example communication bus 202 facilitates communication between the microphone 206, the camera 208, the controller 210, the program guide meter 220, the user interface 230, the program guide generator 240, the program database 250, the example timer 260, and/or the example GPS receiver 270. The example program guide meter 220 of FIG. 2 includes an example collector 222, an example monitor 224, and an example selector 226.

In the illustrated example of FIG. 2, the example antenna 201 facilitates wireless communication with an example network (e.g., the network 110). In some examples, the data port 204 facilitates wired communication (e.g., USB (universal serial bus), etc.) with other devices (e.g., a personal computer, the television 106, the STB 108, etc.).

The example controller 210 of FIG. 2 facilitates control of the consumer electronics device 104 by analyzing data received from the antenna 201, the data port 204 and/or the user interface 230. The user interface 230 may include any of or all of a touchscreen, display, keyboard, mouse, etc. of the consumer electronics device 104. Furthermore, the controller 210 of the illustrated example controls the microphone 206 and/or the camera 208 to collect data. In some examples, when the program guide meter 220 is activated (e.g., by instructions from the user interface 230), the controller 210 instructs the microphone 206 and/or the camera 208 to send the collected audio and/or video/images, respectively, to the program guide meter 220.

In the illustrated example of FIG. 2, the collector 222 of the program guide meter 220 identifies and collects identifying information (e.g., samples of audio and/or video, watermarks, digital signatures, codes, etc.) from the audio collected by the microphone 206 and/or the images collected by the camera 208. In some examples, the collector 222 processes the received audio signal and/or images to determine the identifying information. The collector 222 of the illustrated example forwards the identifying information to the selector 226.

In some examples, program information (e.g., a program name, character being displayed on the screen, broadcast channel and/or time of the program, game-time of a sporting event, etc.) identified based on the collected identifying information may be displayed via the user interface 230. The displayed information need not be for a currently tuned program but may instead be for an upcoming program or past program. In the illustrated example, a database (e.g. the databases 250, 124) stores identifying information in association with corresponding program information. The controller 210 of the illustrated example identifies the program associated with the identifying information and retrieves the corresponding program information from the database. In some examples, the collector 222 timestamps the identifying information as it is collected.

The example monitor 224 of the program guide meter 220 of FIG. 2 monitors characteristics of the consumer electronics device 104 while the collector 222 identifies and/or processes identifying information. In some examples, the characteristics of the consumer electronics device 104 include at least a length of time it collects identifying information associated with a program or a location. The example monitor 224 of FIG. 2 monitors the length of time the collector 222 collects identifying information using the timer 260 of the consumer electronics device 104. The example monitor 224 of FIG. 2 monitors the geographic location of the consumer electronics device 104 using a global positioning system (GPS) receiver 270 of the consumer electronics device 104. In some examples, the monitor 224 determines a geographic location of the consumer electronics device 104 based on the location of a wireless access point, base station, etc. in communication with the consumer electronics device 104. The monitor 224 of the illustrated example provides the characteristics of the consumer electronics device 104 to the selector 226. The selector 226, as described below in further detail with respect to FIG. 3, determines when a program being viewed is eligible for use in a custom electronic program guide. The selector 226 notifies the controller 210 once the program is eligible for use in the custom electronic program guide and provides the controller 210 the identifying information. In some examples, the selector 226 and/or the controller 210 is partially or entirely located in the central data facility 120.

In the illustrated example of FIG. 2, when the selector 224 notifies the controller 210 that a program or other media is eligible to be added to the custom electronic program guide (e.g., because the program or other media has been presented for more than a threshold period of time (e.g., longer than three minutes, etc.)), the controller 210 determines whether or not to add program information associated with identifying information to the custom television guide. In some examples, the controller 210 automatically determines whether or not to add the program based on user and/or default settings for the custom television guide. In some examples, the settings for automatically adding the program to the custom EPG include one or more of the channel airing the program, the location where the program is identified, the type of program (e.g., first aired, rerun, live, etc.), the time of day that the program is identified, and/or the length of time that the program has been exposed to the consumer electronics device 104. In some examples, the controller 210 prompts the user via the user interface 230 to request authorization for the addition of the program to the electronic program guide. In some examples, the controller 210 requests program information from a central data facility and/or the program database 250 based on the identifying information prior to prompting the user. In some such examples, the controller 210 includes the program information (e.g., the program name, program schedule, etc.) in the prompt.

The example controller 210 of FIG. 2 sends a request for program information associated with the identifying information via the data port 202 to the central data facility 120 of FIG. 1. The central data facility 120 cross-references the identifying information to program information stored in a database (e.g., the database 124) and responds with corresponding program information associated with the identifying information. In some examples, the controller 210 retrieves the corresponding program information from the program database 250 by cross-referencing the identifying information to program information stored in the database 250. The data in the program database 250 may be, for example, cached signatures as detailed in U.S. Pat. No. 9,106, 953, which is incorporated herein by reference in its entirety. Upon receipt of the program information, the controller 210 forwards the program information data to the program guide generator 240 to generate the custom television guide.

In some examples, the controller 210 of FIG. 2 sends demographic profile information of the user associated with consumer electronics device 104 along with the identifying information for use in audience measurement. In the illustrated example, the demographic profile information is stored at the central data facility 120 in association with identifier(s) of the audience member(s) to facilitate audience measurement. The demographic profile information is used by the central data facility 120 to generate estimates of the demographic composition of the audience (and/or subset(s) of the audience) viewing the media associated with the identifying information.

In the illustrated example of FIG. 2, the program guide generator 240 generates a custom electronic program guide (EPG) for a user (e.g., the audience member 102). The EPG may be for any type of media such as television, radio, streaming Internet media, etc. In some examples, the program guide generator 240 receives instructions based on user input from the user interface 230 and/or the program guide meter 220 for use in generating the custom EPG. In some examples, the controller 210 instructs the program guide generator 240 to include program information received from the central data facility 120 and/or stored in the program database 250 in the EPG. In some examples, the program guide generator 240 generates the program guide using metadata stored in the program database 250 and/or by adding the program information to a previously stored EPG in the program database 250. Accordingly, the custom EPG for the example user(s) of the consumer electronics device 104 includes newly received program information and previously selected or viewed program information that has already been included in a prior version of the user(s)' custom EPG. In some examples, the program guide generator 240 stores the generated EPG in the program database.

In the illustrated example, an example user (e.g., the audience member 102) can manually add program(s) to the custom EPG. The user may enter a request to search for program (s) of interest via the user interface 230. In response, the example controller 210 of FIG. 2 searches for the requested program and associated program information within the program database 250 and/or sends a request to a website (e.g., a website hosted by the central data facility 120) for program information associated with the media. After the controller 210 of the illustrated example receives the requested program information, the controller 210 instructs the program guide generator 240 to add the requested program information to the custom EPG for the user.

In the illustrated example, the user interface 230 renders the generated EPG for display to the user (e.g., via a display or touchscreen). In some examples, the controller 210 forwards the generated EPG to one or more media presentation device(s) (e.g., the television 106, the STB 108, etc.) for display.

The program database 250 of the illustrated example stores program information (e.g., program information received from the example central data facility 120). The stored program information may include media name(s), media description(s), media schedule(s), identification of similar and/or related media and their corresponding program information, etc. In some examples, the program information in the program database 250 is stored in association with identifying information to facilitate local identification of media by the program guide meter 220. In some examples, the program information is stored with corresponding identifying information (e.g., watermarks, digital signatures, channel numbers, timestamps, etc.) associated with the program information. Although the program guide database 250 is shown within the consumer electronics device 104 in FIG. 2, in some examples the program database 250 is partially or entirely located in a storage device external to the consumer electronics device 104 (e.g., in the database 124 of the central data facility 120, in a media presentation device, etc.).

While an example manner of implementing the meter/consumer electronics device 104 of FIG. 1 has been illustrated in FIG. 2, one or more of the elements, processes and/or devices illustrated in FIG. 2 may be combined, divided, rearranged, omitted, eliminated and/or implemented in any other way. Further, the example controller 210, the example program guide meter 220, the example collector 222, the example monitor 224, the example selector 226, the example user interface 230, the example program guide generator 240, the example program database 250, the example timer 260, the example GPS receiver 270 and/or, more generally, the example meter and/or consumer electronics device 104 of FIGS. 1 and/or 2 may be implemented by hardware, software, firmware and/or any combination of hardware, software and/or firmware. Thus, for example, any of the example controller 210, the example program guide meter 220, the example collector 222, the example monitor 224, the example selector 226, the example user interface 230, the example program guide generator 240, the example program database 250, the example timer 260, the example GPS receiver 270 and/or, more generally, the example meter and/or consumer electronics device 104 could be implemented by one or more circuit (s), programmable processor(s), application specific integrated circuit(s) (ASIC(s)), programmable logic device(s) (PLD(s)) and/or field programmable logic device(s) (FPLD (s)), etc. When any of the apparatus or system claims of this patent are read to cover a purely software and/or firmware implementation, at least one of the example controller 210, the example program guide meter 220, the example collector 222, the example monitor 224, the example selector 226, the example user interface 230, the example program guide generator 240, the example program database 250, the example timer 260, and/or the example GPS receiver 270 are hereby expressly defined to include a tangible computer readable storage medium such as a memory, DVD, CD, Blu-ray, etc. storing the software and/or firmware. Further still, the example meter and/or consumer electronics device 104 of FIGS. 1 and/or 2 may include one or more elements, processes and/or devices in addition to, or instead of, those illustrated in FIG. 2, and/or may include more than one of any or all of the illustrated elements, processes and devices.

Figure 3:
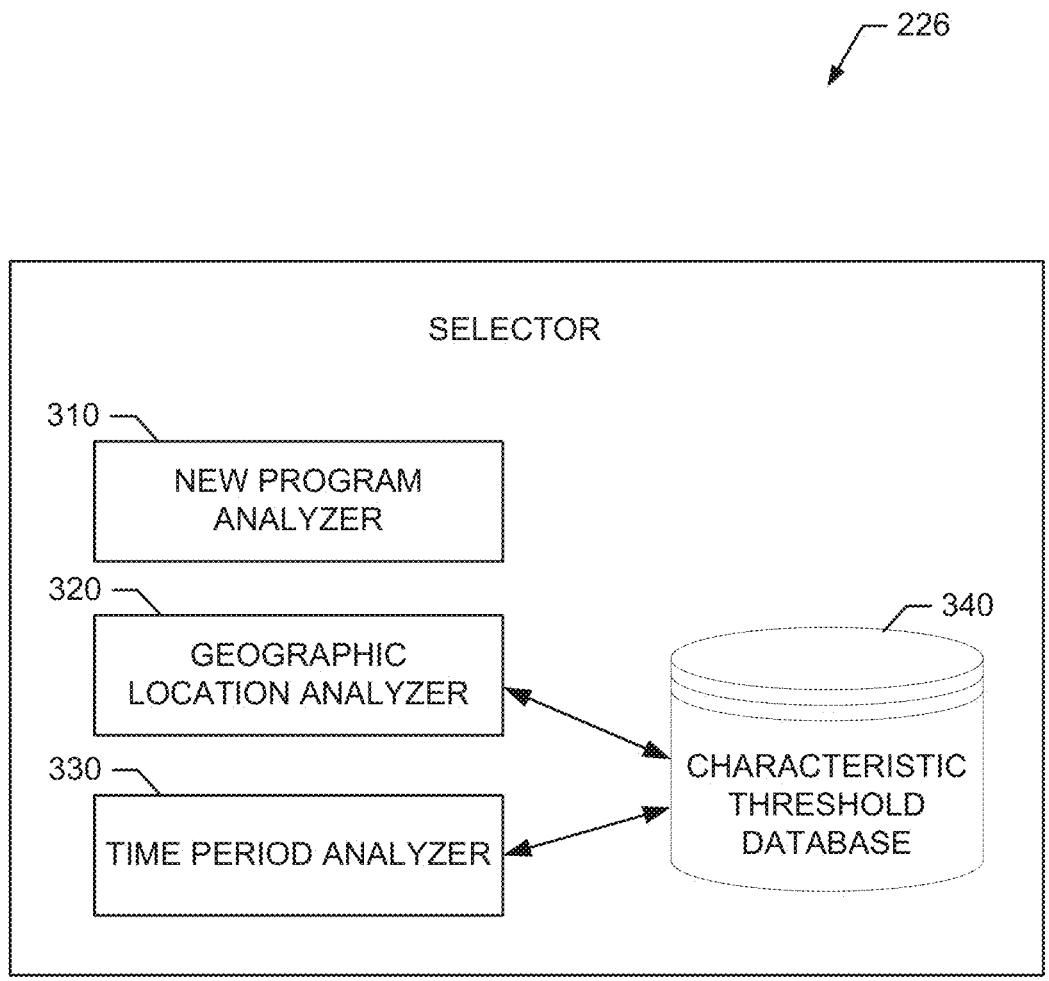
FIG. 3 is a block diagram of an example implementation of the example selector depicted in FIG. 2.

FIG. 3 illustrates an example implementation of the example selector 226 of FIG. 2. The example selector 226 includes an example new program analyzer 310, an example geographic location analyzer 320, an example time period analyzer 330, and an example characteristic threshold database 340. The characteristic threshold database 340 may be implemented by the example program database 250 of FIG. 2. In the illustrated example, the selector 226 determines whether collected identifying information associated with a program should be used in generating a custom EPG with program information associated with the program.

In the illustrated example of FIG. 3, the selector 226 receives identifying information from the collector 222 of FIG. 2 and the monitor 224. Upon receipt of the identifying information from the collector 222, the new program analyzer 310 determines whether the identifying information is associated with program information currently provided in a custom EPG. The new program analyzer 310 of the illustrated example cross-references the identifying information with the custom EPG data stored in the program database 250. If the identifying information is associated with a program already included in the custom EPG, then the selector 226 determines that the identifying information does not need to be processed to add the program to the custom EPG. If the identifying information is not associated with a program already included in the custom EPG, then the selector determines that the program associated with the identifying information is to be used in generating the custom EPG.

The example geographic location analyzer 320 of FIG. 3 analyzes whether a geographic location of the example consumer electronics device 104 of FIG. 2 associated with the collected identifying information meets a characteristic criterion. The geographic location characteristic is used to determine whether a program associated with the identifying information is to be included in a custom EPG. The geographic location characteristic may be based on a user input from the user interface 230 and/or based on a default setting. One or more criteria and/or threshold(s) for the geographic location characteristic may be stored in the characteristic threshold database 340 and may be altered by the user via the example user interface. In some examples, any program(s) identified in designated area(s) (e.g., a home location, see example of FIG. 6) are used in the custom EPG. The designated location(s) are defined by the geographic location characteristic criteria. If the consumer electronics device 104 is located within a designated area as defined by the geographic location characteristic criteria, then the program is eligible for use in generating the custom EPG. In some examples, if the example consumer electronics device 104 is outside of the designated area, the selector 226 of FIG. 3 determines that the program associated with the identifying information is not to be included in the custom EPG. In some examples, the user is prompted to authorize use of the identifying information when the geographic location is outside of the designated area and/or the user is not prompted to authorize the use when the geographic location is within the designated area.

The example geographic location analyzer 320 of FIG. 3 receives location information from the example monitor 224 corresponding to the time period during which the identifying information was collected. The geographic location analyzer 320 of the illustrated example cross-references the location of the consumer electronics device 104 with the geographic location characteristic criteria in the characteristic threshold database 340. If the consumer electronics device 104 is located within an area specified by the geographic location characteristic criteria, then the geographic location analyzer 320 determines that the threshold is met and the program associated with the collected identifying information is eligible to be used in generating the custom EPG.

The example time period analyzer 330 of FIG. 3 analyzes whether a time period characteristic threshold consumer electronics device associated with collecting identifying information is met. The time period characteristic is used in the illustrated example to determine whether a program associated with the identifying information is eligible to be used in a custom EPG. The time period characteristic threshold may be set based on a user input from the example user interface 230 and/or based on a default setting. One or more time period characteristic threshold(s) may be stored in the characteristic threshold database 340. If the consumer electronics device 104 has been exposed to a program for at least a time period (e.g., thirty seconds, 1 minute, five minutes, fifteen minutes, etc.) greater than the time period threshold, then the program is eligible for use in generating the custom EPG. If the consumer electronics device 104 has not been exposed to a program for at least the designated length of time, then the example selector 226 of FIG. 3 determines that the program associated with the identifying information is not to be included the custom EPG. In detecting the duration of an exposure, commercials may or may not be factored in, for example, an interruption of an exposure of less than two minutes may be ignored in detecting if the exposure meets the exposure threshold.

The time period analyzer 330 of FIG. 3 receives timing information from the example monitor 224 and/or timer 260 corresponding to the time period during which the identifying information was collected by an example collector. The example timing information includes a length of time that the consumer electronics device 104 is exposed to a program and/or its associated advertisement(s). The program's associated advertisement(s) of the illustrated example are associated with a program based on whether or not they air on the same channel before, after, and/or between segments of the program. To determine the length of time the program is exposed to the consumer electronics device 104, the example monitor 224 determines the length of time identifying information corresponding to the program and/or its advertisements is being collected. The timer 260 is reset when the collector 222 collects identifying information for a new program different from the example program and/or its advertisements. If continuously received (or a percentage of continuously received) collected pieces of identifying information correspond to the same program and its associated advertisement(s) then the monitor 224 continues the timer 260. In some examples, the timer 260 is allowed to run even if identifying information different from the program is detected (e.g., during a commercial break) for less than a set threshold period of time so that commercials, news flashes, channel surfing during commercials, a mute during a phone call, noise in the measurement, and/or other interruptions do not mask the fact that the program was substantially continuously watched. In the illustrated example, if the monitor 224 determines that one or more continuously collected piece(s) of identifying information (e.g. one or more signatures, watermarks, etc.) are not associated with a previously identified program, then the timer 260 is reset if such identifying information collected longer than the set threshold (e.g., a time associated with a typical commercial break, such as ninety seconds). The time period analyzer 330 receives the length of time as measured by the timer 260 from the monitor 224.

In some examples, if a certain percentage of the collected identifying information during a time period (e.g., a sliding window) corresponds to the same program and/or associated advertisement(s), then the time period analyzer 330 determines that the time period characteristic threshold has been reached. In some examples, the monitor 224 keeps track of all collected pieces of identifying information for the threshold period of time. In some such examples, the monitor 224 identifies the programs exposed to the consumer electronics device during the threshold period of time. If a certain percentage (e.g., 70%) of the identifying information is related to the same program then the time period analyzer 330 determines that the time period characteristic threshold has been met.

In some examples, the monitor 224 utilizes a sliding window of time and an identifying information threshold. For example, if seventy percent (70%) of the signatures (and/or watermarks) collected during the example time period correspond to the same program, then the monitor 224 instructs the selector 226 that the threshold has been met. Such examples allow for the time period characteristic threshold to be met despite interruptions in the viewing of the example program (e.g., due to commercials, brief channel surfing, a mute, etc.).

In some examples, the time period analyzer 330 of FIG. 3 cross-references the length of time the consumer electronics device 104 has been either continuously or non-continuously exposed to a program (by tracking the length of time the consumer electronics device collector 222 collects identifying information associated with the program), to the time period characteristic threshold in the characteristic threshold database 340. If the consumer electronics device 104 has been exposed to the program for at least the designated threshold of time, then the selector 226 of FIG. 3 determines that the threshold is met and the program associated with the collected identifying information is to be included in the custom EPG.

While an example manner of implementing the selector 226 of FIG. 2 has been illustrated in FIG. 3, one or more of the elements, processes and/or devices illustrated in FIGS. 2 and/or 3 may be combined, divided, re-arranged, omitted, eliminated and/or implemented in any other way. Further, the example new program analyzer 310, the example geographic location analyzer 320, the example time period analyzer 330, the example characteristic threshold database 340, and/or, more generally, the example selector 226 of FIGS. 2 and/or 3 may be implemented by hardware, software, firmware and/or any combination of hardware, software and/or firmware. Thus, for example, any of the example new program analyzer 310, the example geographic location analyzer 320, the example time period analyzer 330, the example characteristic threshold database 340, and/or, more generally, the example selector 226 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent involving a program analyzer, a geographic location analyzer or a time period analyzer are read to cover a purely software and/or firmware implementation, at least one of the example new program analyzer 310, the example geographic location analyzer 320, the example time period analyzer 330, the example characteristic threshold database 340, and/or, more generally, the example selector 226 are hereby expressly defined to include a tangible computer readable storage medium such as a memory, DVD, CD, Blu-ray, etc. storing the software and/or firmware. Further still, the example selector 226 of FIG. 3 may include one or more elements, processes and/or devices in addition to, or instead of, those illustrated in FIG. 3, and/or may include more than one of any or all of the illustrated elements, processes and devices.

Figure 4:
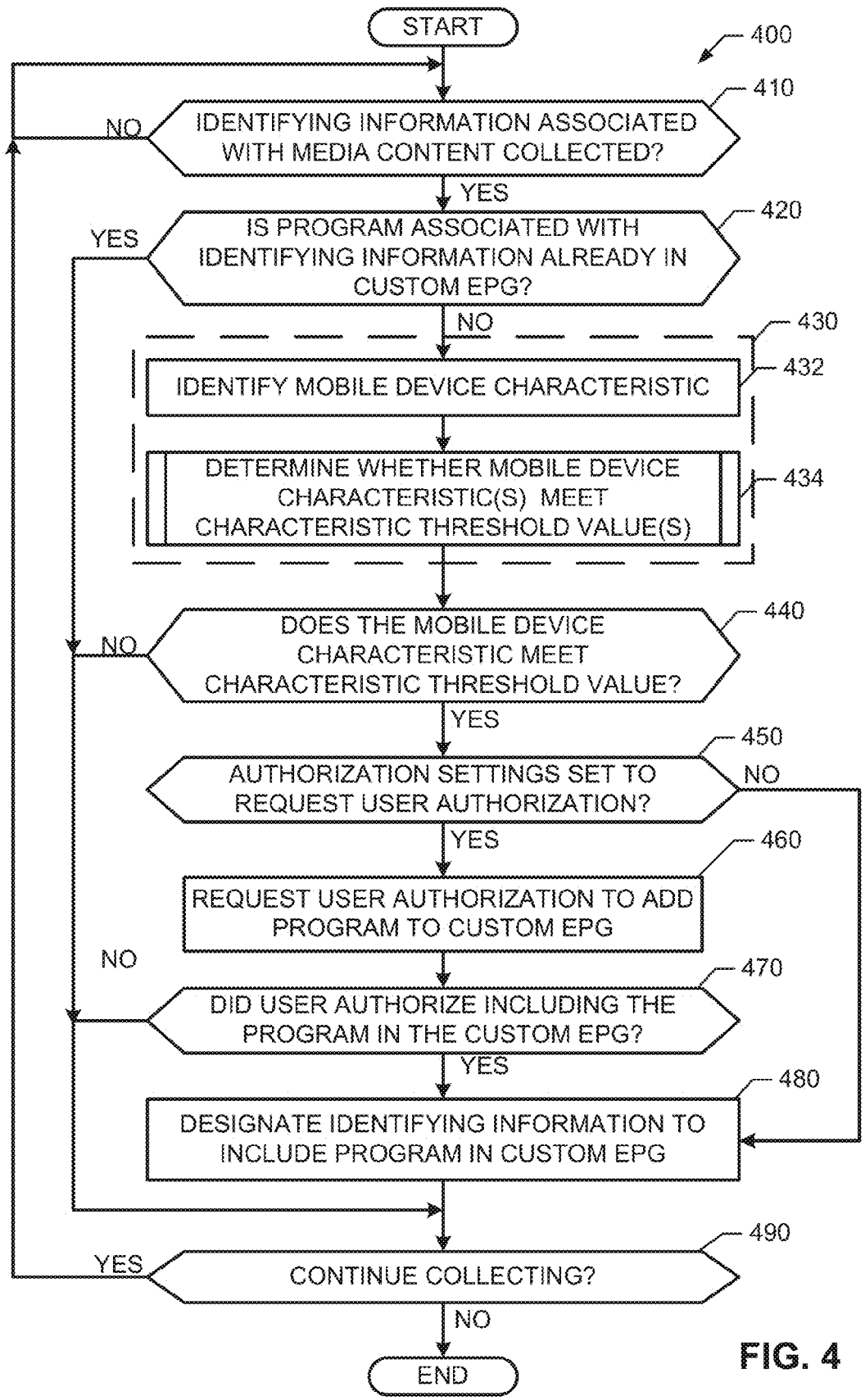
FIG. 4 is a flow chart representative of example machine readable instructions that may be executed to implement the example meter of FIG. 2.
Figure 5:
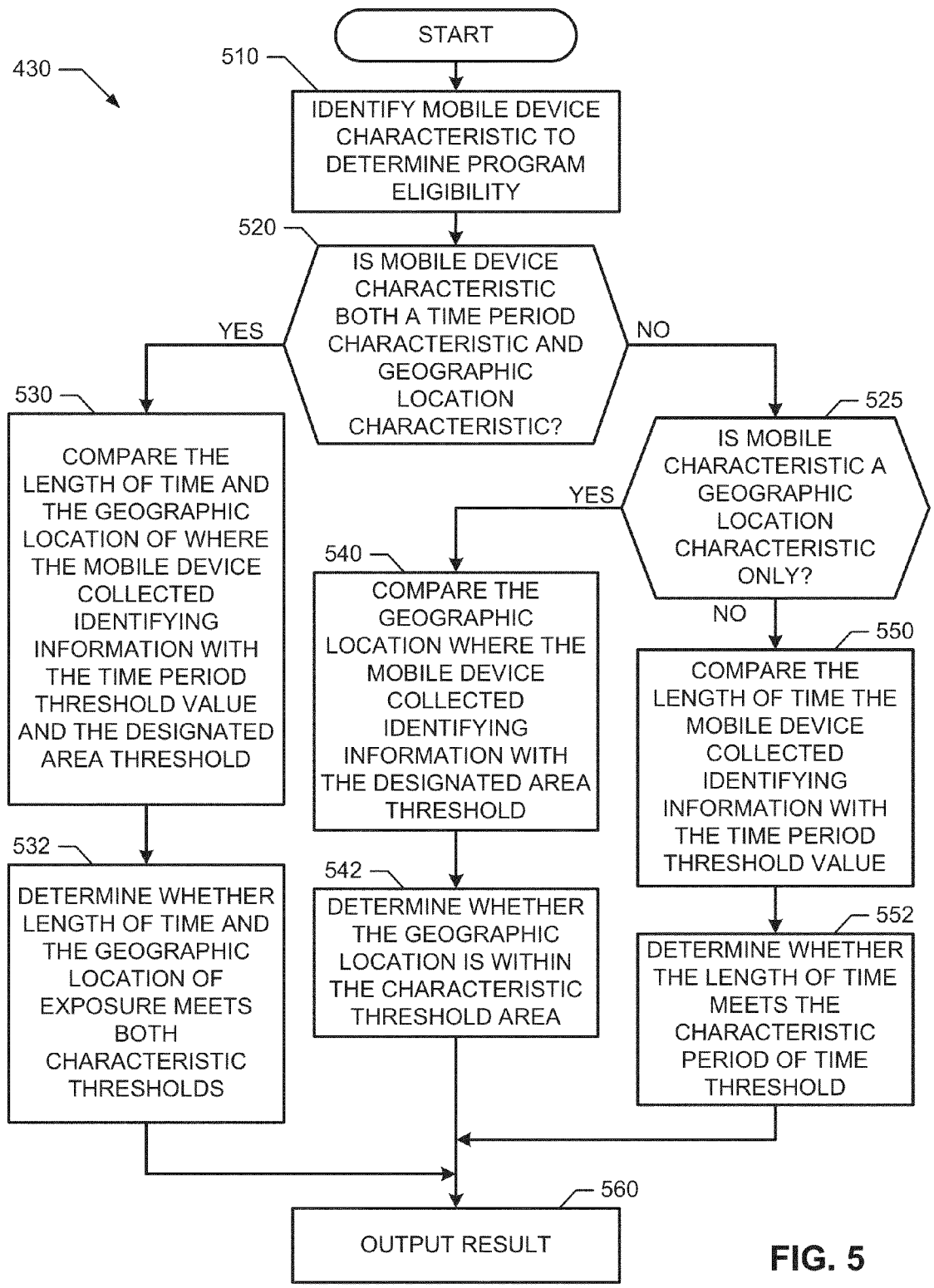
FIG. 5 is a flow chart representative of example machine readable instructions that may be executed to implement the example meter of FIG. 2 and/or the example selector of FIG. 3.

A flowchart representative of example machine readable instructions for implementing the consumer electronics device 104 of FIGS. 1 and/or 2, and in particular the example controller 210, the example program guide meter 220, the example collector 222, the example monitor 224, the example selector 226, the example user interface 230, the example program guide generator 240, the example timer 260, and/or the example GPS receiver 270 of FIG. 2, is shown in FIG. 4. A flowchart representative of example machine readable instructions for implementing the selector 226 of FIGS. 2 and/or 3, and in particular the example new program analyzer 310, geographic analyzer 320, and/or time period analyzer 330 is shown in FIG. 5. In these examples, the machine readable instructions comprise a program for execution by a processor such as the processor 1912 shown in the example processor platform 1900 discussed below in connection with FIG. 19. The program may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 4 and/or 5, many other methods of implementing the example consumer electronics device 104 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals. Additionally or alternatively, the example processes of FIGS. 4 and/or 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable medium is expressly defined to include any type of computer readable storage disk or storage device and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 400 that may be executed to implement the consumer electronics device 104 of FIGS. 1 and/or 2 are represented by the flow chart shown in FIG. 4. At block 410, example collector 222 of example program guide meter 220 determines whether the consumer electronics device 104 has been exposed to media (e.g., a television program, radio program, etc.) based on whether the collector 222 has identified and collected identifying information (e.g., metadata, signatures, codes, watermarks, etc.) in a media exposure environment. The collector 222 collects the identifying information from at least one of audio, video, and/or or image(s) captured by the microphone 206, camera 208, and/or other sensors (e.g., optical, infrared, etc.) of the consumer electronics device 104. If the collector 222 does not collect identifying information associated with identifiable media, then the collector 222 continues to monitor the audio, video, and/or images exposed to the consumer electronics device 104 at block 410. If the collector 222 does collect identifying information, control moves to block 420. In some examples, the controller 210 uses the identifying information to retrieve program information (e.g., program name, character name, cast information, episode information, scene information, etc.) from the program database 250 and/or the central data facility database 124 to display on the user interface 230 of the consumer electronics device 104.

At block 420 of FIG. 4, the program guide meter 220, via example selector 226, determines whether the collected identifying information is associated with a program that is currently included in a custom EPG for the user. In the illustrated example, the identifying information of program(s) that are included in the custom EPG are stored in example program database 250. At block 420, the selector 226 cross-checks the program database 250 to determine if the identifying information of the program is included in the custom EPG. In some examples, the selector 226 and/or the controller 210 cross-check(s) the database 124 at the central data facility 120 of FIG. 1 to determine whether the program associated with the collected identifying information is included in the custom EPG. In some such examples, the controller 210 crosschecks the database 124 to identify the program and the selector crosschecks the program database 250 to determine if the program is included in the custom EPG. In FIG. 4, if the example selector 226 determines that the collected identifying information is associated with a program included in the custom EPG, then control moves to block 490. If the selector 226 determines that the identifying information is not used in generating the custom EPG, control moves to block 432.

An example implementation of the instruction blocks 432, 434 are illustrated within dashed block 430 in FIG. 4 are further described below with reference to FIG. 5.

At block 432 of FIG. 4, the selector 226 identifies one or more consumer electronics device characteristic(s) used to determine whether the identified program is to be included in the custom EPG. In some examples the consumer electronics device characteristic(s) include one or more of a time period characteristic or a geographic location characteristic. At block 432, the selector 226 identifies the consumer electronics device characteristic(s) based on one or more of a default setting or a user selection.

At block 434 of FIG. 4, the selector 226 receives the consumer electronics device characteristic(s) from the example monitor 224 and cross-references the consumer electronics device characteristic(s) to one or more designated threshold values and/or other criteria stored in example characteristic threshold value database 340. In some examples, a threshold value for a time characteristic is a time period and/or length of time that the collector 222 collects identifying information. In some examples, a threshold value for a time characteristic is a percentage of the identifying information collected for a certain time period that is associated to the same program (e.g., 75% of the identifying information collected in a 15 minute period corresponding to the program "Love It or List It" and the remaining percentage of the identifying information corresponds to commercials, channel surfing, etc.) In some examples, a designated geographic area (e.g., measured by a distance such as a radius from a geographic location of interest) may be used for a geographic location criterion (e.g., see FIG. 6). In some examples, the consumer electronics device characteristic thresholds and/or criteria are assigned based on default settings. In some examples, a user may adjust the device characteristic threshold values and/or settings using the user interface 230. Once the selector 226 determines whether the consumer electronics device characteristic(s) meet the characteristic threshold value(s), as further described herein with reference to FIG. 5, control moves to block 440 of FIG. 4.

At block 440 of FIG. 4, if the characteristic(s) of the consumer electronics device 104 measured by the monitor 224 do not meet the characteristic threshold value(s) and/or criteria, control moves to block 490. If the characteristic(s) of the consumer electronics device 104 do meet the characteristic threshold value(s) and/or criteria, control moves to block 450.

At block 450 of FIG. 4, the meter 220 identifies user authorization settings for collecting identifying information. The meter 220 of the illustrated example determines whether to request a user for authorization to include the program associated with the collected identifying information in the custom EPG. In some examples, the meter 220 determines whether or not to prompt the user for authorization based on default settings and/or user preferences. In some examples, the prompting is performed via the user interface 230.

In some examples, a user selects scenarios for when user authorization is to be requested by the consumer electronics device 104 (e.g., time(s) of day when the identifying information is collected, one or more geographic location(s) where the identifying information is collected, ratings information for program associated with identifying information etc.). In the illustrated example, the meter 220 determines whether the user is to be prompted for authorization based on the settings (block 450). In some examples, the user is prompted if the consumer electronics device 104 is located at a geographic location outside of a designated area. If user authorization settings indicate that the user is to be prompted for authorization to use the identifying information in generating the custom EPG, control moves to block 470. In FIG. 4, if user authorization default settings and/or preferences indicate that authorization is not to be requested from (block 450), control moves to block 480.

At block 460 of FIG. 4, the meter 220 instructs the controller 210 to prompt the user via the user interface 230 to authorize the inclusion of the program associated with the collected identifying information in the custom EPG. In some examples, the meter 220 and/or controller 210 retrieves program information (e.g., a program name, program description, etc.) associated with the identifying information from the program database 250 and/or the database 124, and displays the program information via the user interface 230 along with the prompt for authorization.

In the example of FIG. 4, after the controller 210 prompts the user for authorization, at block 470, if the meter 220 determines the user did not authorize the inclusion of the program associated with the collected identifying information in the custom EPG, control moves to block 490. If the user does authorize including the program, control moves to block 480.

At block 480 of the illustrated example of FIG. 4, the selector 226 designates the collected identifying information to include the corresponding program in the custom electronic program guide. The selector 226 forwards the identifying information to the program guide generator 240. Upon receipt of the designated identifying information, the program guide generator 240 cross-references the collected identifying information with the program information in the program database 250. In some examples, the program guide generator 240 instructs the controller 210 to retrieve program information associated with the identifying information from the database 124 of the central data facility 120. The program guide generator 240 updates the custom EPG to include the program information associated with the designated identifying information. For example, the custom EPG may be updated to identify presentation time, title, rating and broadcast channel for the program.

At block 490, the meter 220 determines whether to continue collecting identifying information via the collector 222. If the consumer electronics device 104 is to continue collecting identifying information, control returns to block 410. If the consumer electronics device 104 is to stop collecting identifying information, the instructions 400 end. In some examples, the collector 222 continues to collect identifying information until a user instructs the consumer electronics device 104 via the user interface 230 to end "listening mode." In some examples, the consumer electronics device 104 stops collecting identifying information after a threshold period of time. In some examples, the consumer electronics device 104 stops collecting identifying information after determining the identifying information associated with the same program has been collected for a designated period of time. In such examples, awakening may occur to restart data collection pursuant to the example of FIG. 4 after another threshold period of time has passed.

FIG. 5 illustrates example computer readable instructions that may implement the instructions blocks 432, 434 of the dashed block 430 of FIG. 4. The instructions 430 of FIG. 5 determine whether a program associated with identifying information collected by an example collector 222 of an example consumer electronics device 104 is to be included in a custom EPG. At block 510, the selector 226 identifies one or more consumer electronics device characteristic(s)/criterion used to determine whether the program is to be included in the custom EPG. In the illustrated example of FIG. 5, the consumer electronics device characteristic(s)/criterion are one or more of a geographic location or a time period of exposure, though other consumer electronics device characteristic(s)/criteria may be used.

At block 520 of FIG. 5, if the selector 226 identifies that the consumer electronics device characteristic(s) criterion are both a time period characteristic and a geographic location characteristic, then control moves to block 530. At block 530 of FIG. 5, the selector 226 receives the geographic location from the GPS receiver 270 identifying where the consumer electronics device 104 collected identifying information. At block 530, the selector also receives a length of time from the timer 260 that the collector 222 has been collecting the identifying information associated with an example program from an example monitor 224. In some examples, the time period is not retrieved directly from the timer 260, but instead is calculated based on timestamps associated with logged identifying information to specific time(s) of collection. In some examples, the time period is retrieved from the timer 260 and the timer 260 is reset if identifying information that does not correspond to the program is detected for more than a threshold time period (e.g., two minutes). In the illustrated example, an example geographic location analyzer 320 compares the received geographic location with the designated area(s) stored in the example characteristic threshold database 340. The example time period analyzer 330 compares the received length of time with the time period threshold value stored in the characteristic threshold database 340.

At block 532 of the illustrated example, if the received geographic location is within a designated area, then the geographic location analyzer 320 determines that the geographic location threshold has been met. If the received length of time is greater than the time period threshold, then the time period analyzer 330 determines that the time period threshold has been met. In some examples, the time period threshold is satisfied if a certain percentage of the pieces of identifying information collected during a given time period are associated with the same program. If the threshold percentage is satisfied, then the time period threshold is determined to have been reached. If both the geographic location threshold and the time period threshold have been met, at block 560, control outputs that the consumer electronics device characteristic threshold has been met. In the illustrated example, if either the geographic location threshold or the time period threshold has not been met, then at block 560, control outputs that the consumer electronics device characteristic threshold has not been met.

In the illustrated example of FIG. 5, at block 520, if the selector 226 identifies that the consumer electronics device characteristic is not both a time period characteristic and a geographic location characteristic, then control moves to block 525. At block 525 if the selector 226 identifies that the consumer electronics device characteristic is a geographic location characteristic, then control moves to block 540. At block 540, the monitor 224 receives the geographic location of where the consumer electronics device 104 collected identifying information from the example GPS receiver 270. The monitor 224 provides the selector 226 with the geographic location information. The example geographic location analyzer 320 of the selector 226 compares the received geographic location with the designated area stored in the example characteristic threshold database 340.

At block 542 of the illustrated example of FIG. 5, if the geographic location of the consumer electronics device 104 is within the designated area, then the geographic location analyzer 320 determines that the geographic location threshold has been met. If the geographic location threshold has been met, then at block 560, control outputs that the consumer electronics device characteristic threshold has been met. If the geographic location threshold has not been met, then at block 560, control outputs that the consumer electronics device characteristic threshold has not been met.

In the illustrated example of FIG. 5, at block 525, if the selector 226 identifies the consumer electronics device characteristic is not a geographic location characteristic, then control moves to block 550. At block 550, the selector 226 receives the length of time the collector collected the identifying information associated with an example program from the example monitor 224. The example time period analyzer 330 compares the received length of time with the time period threshold value stored in the example characteristic threshold database 340. In some examples, the time period threshold is satisfied if at least a certain percentage of the pieces of identifying information collected during a given time period are associated with the same program. If the threshold percentage (e.g., 85%) is satisfied, then the time period threshold is determined to have been reached.

At block 552 of the illustrated example of FIG. 5, if the received length of time is greater than the time period threshold, then the time period analyzer 330 determines that the time period threshold has been met. If the time period threshold has been met, at block 560, control outputs that the consumer electronics device characteristic threshold has been met. If the time period threshold has not been met, then at block 560, control outputs that the consumer electronics device characteristic threshold has not been met.

Figure 6:
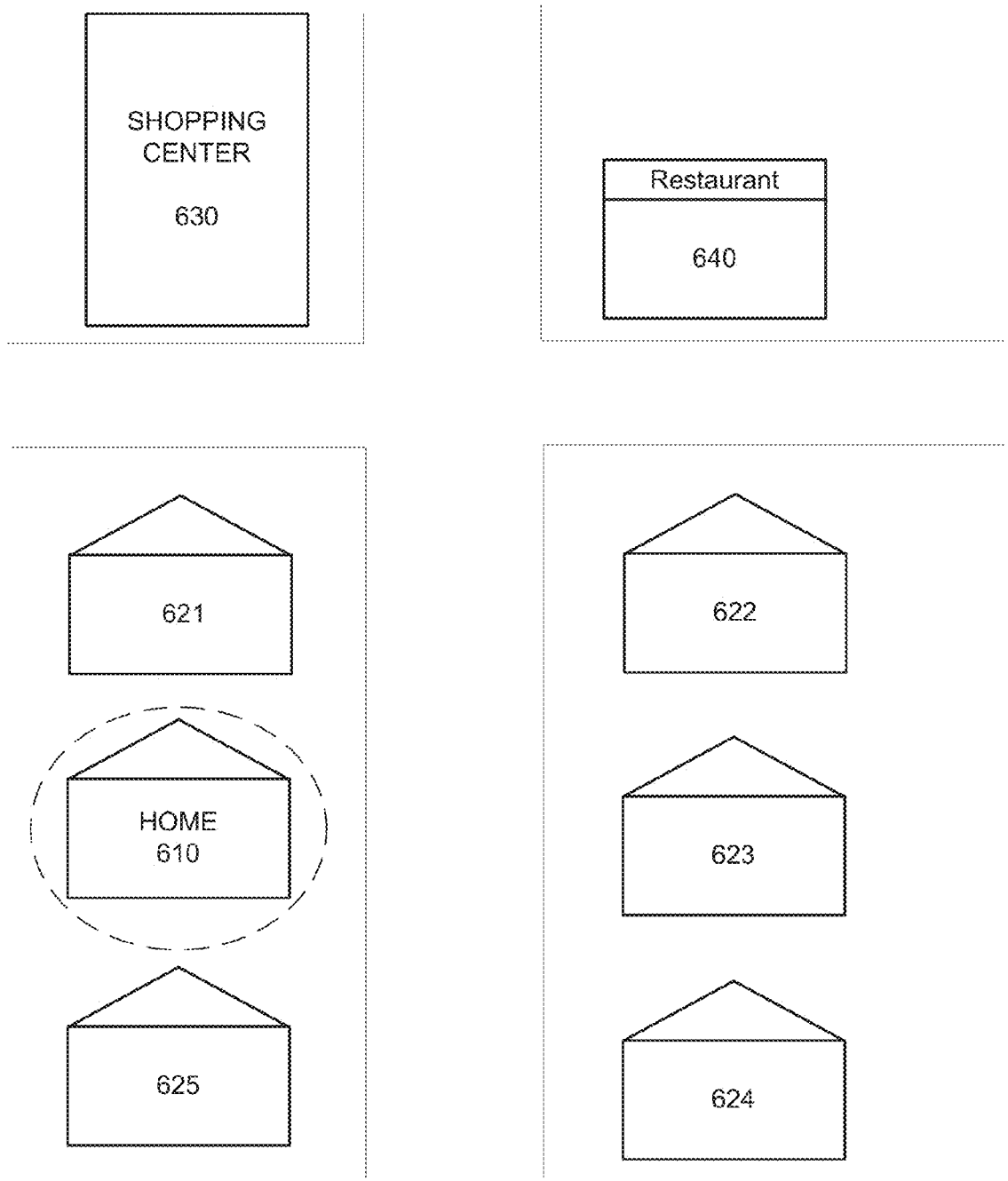
FIG. 6 illustrates an example media exposure environment depicting example locations in which meters may collect identifying information associated with media.

FIG. 6 illustrates an example environment of use 600 for the consumer electronics device 104 of FIGS. 1 and/or 2. The example consumer electronics device 104 collects identifying information throughout the environment 600 and determines if program information associated with the identifying information is to be included in a custom EPG. The example environment of use 600 includes a user home 610 in an example neighborhood of residences 621-625, a shopping center 630, and a restaurant 640. The dashed circle surrounding example home 610 corresponds to a threshold distance enclosing an example designated area 615. In some examples, the designated area is defined by a geographic center or other geographic coordinates of the home and a threshold radius from that geographic location. The designated area threshold information (e.g., a geographic location and threshold radius measured from the geographic location) is stored in an example database (e.g., the characteristic threshold database 340 of FIG. 3).

In the illustrated example of FIG. 6, the monitor 224 of the consumer electronics device 104 determines the geographic location of the consumer electronics device 104 via the GPS receiver 270. In some examples, the consumer electronics device 104 determines the geographic location of the consumer electronics device 104 based on one or more wireless access points, cellular base stations, etc. in communication with the consumer electronics device 104. For example, if the consumer electronics device 104 is communicatively connected to a wireless router of the home 610, the monitor can determine that the consumer electronics device 104 is at home. The monitor 224 forwards the geographic location to the selector 226. The selector 226 of the illustrated example determines whether the consumer electronics device 104 is within the designated area 615 using the geographic location analyzer 320.

In the illustrated example of FIG. 6, a user may use the consumer electronics device 104 of FIGS. 1 and/or 2 throughout environment 600. When the consumer electronics device 104 executes the instructions 400 and/or 500 of FIGS. 4 and 5, the consumer electronics device 104 collects any identifying information (e.g., metadata, signatures, codes, watermarks, etc.) exposed to one or more of the microphone 106, camera 108, and/or other sensor(s) of the consumer electronics device.

In the illustrated example of FIG. 6, if the geographic location characteristic of FIG. 5 is to be used, then the consumer electronics device 104 may only include programs associated with identifying information collected in the designated area 615 in the custom EPG. For example, if the consumer electronics device 104 is in the home 610 and the consumer electronics device 104 collects identifying information embedded in a television program presented within the home 610, the identifying information is eligible for use in generating the custom EPG. However, if the example consumer electronics device 104 is in the restaurant 640, and the consumer electronics device 104 collects identifying information embedded in a television program playing on a television in the restaurant, the consumer electronics device 104 does not use the identifying information to generate the custom EPG. In some examples, the geographic location criterion is not used and program(s) are added to the custom EPG wherein the user selects a button (e.g., a "listen" button, see FIGS. 11-18) to identify the program. For example, if the user initiates a Shazam™ application on an iPhone™ to identify a program, the program is automatically added to the custom EPG and/or a media presentation queue of a media presentation application such as Netflix™. In some examples, the user may select a listen button to identify the program, and the user interface 230 prompts the user to indicate whether to add or not to add the identified program to the custom EPG and/or a media presentation queue.

In the illustrated example of FIG. 6, if the geographic location threshold of FIG. 5 is not activated, then the consumer electronics device 104 may use collected identifying information to generate an example custom EPG including program information associated with the identifying information at any location in the environment 600. For example, if the consumer electronics device 104 collects identifying information associated with a television program presented within the home 610 for a threshold period, the identifying information is eligible for use in generating the custom EPG. In other examples, if the consumer electronics device 104 collects identifying information from a radio program played in the shopping center 630 and/or a television program presented in the restaurant 640, for a period of time that meets the time period threshold, then the radio program and/or television program is included in the custom EPG.

Figure 7:
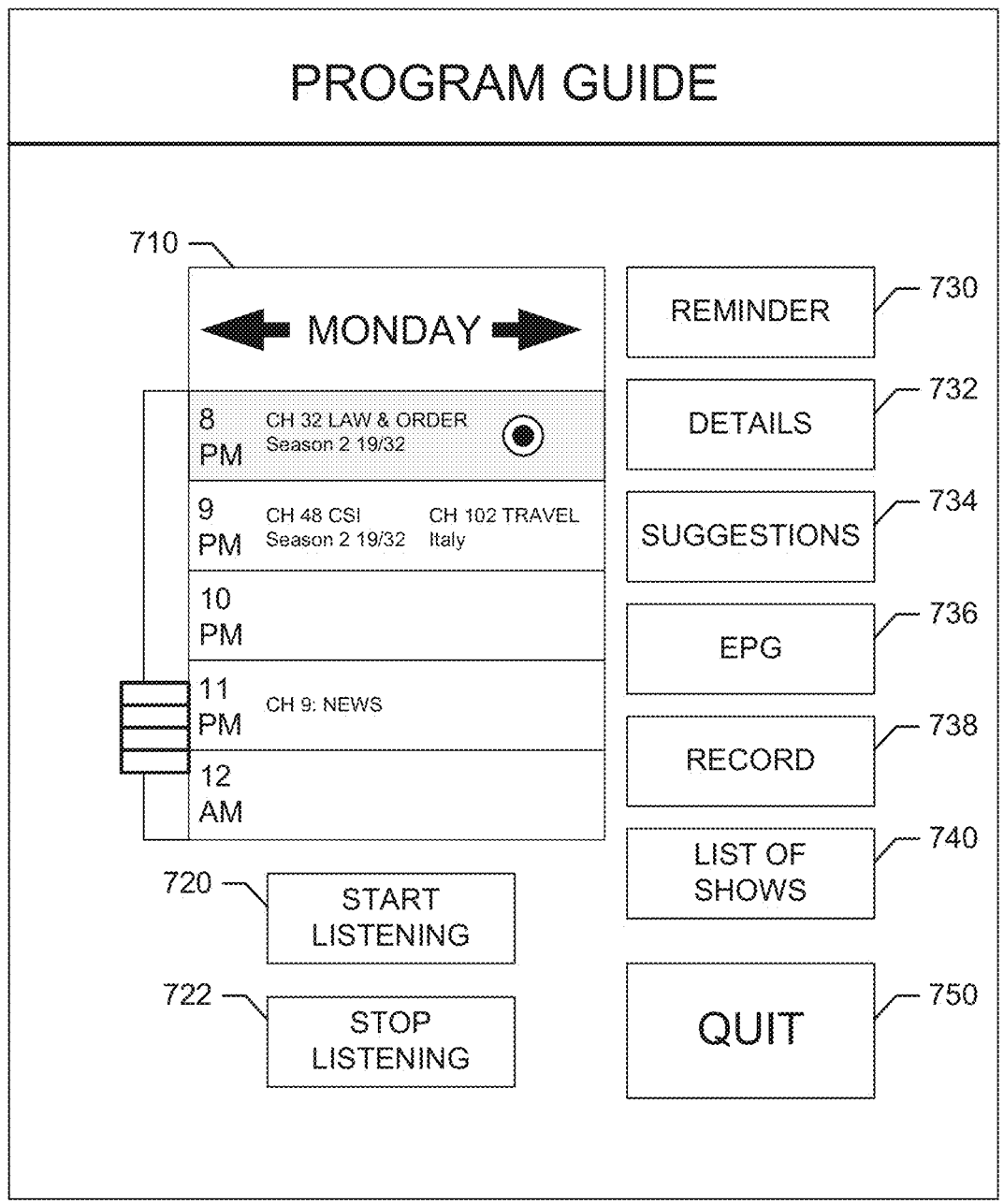
FIGS. 7-10 illustrate a first example graphical user interface (GUI) that may be implemented by the example meter of FIG. 1 and/or the example consumer electronics device of FIG. 2.

FIG. 7 illustrates an example graphical user interface (GUI) 700 that may be implemented by the consumer electronics device 104 of FIGS. 1 and/or 2 to display a custom EPG. The custom EPG may include lists of television programs and/or programs of other media types (radio, stereo, etc.). The example GUI 700 of FIG. 7 may be implemented by program guide generator 240 and displayed via the user interface 230 (e.g., a display, touchscreen, etc.) of the consumer electronics device 104 and/or by a display device (e.g., a television, a monitor, etc.) in communication with the consumer electronics device 104. In the illustrated example of FIG. 7, the GUI 700 is displayed and/or controlled using an example touchscreen of the consumer electronics device 104. In some examples, the GUI 700 may be displayed and/or controlled using one or more media presentation devices (e.g., the television 106, the STB 108, a computer, a laptop computer, a tablet computer, etc.). The example GUI of FIG. 7 is displayed on the device after opening a custom EPG application on the consumer electronics device 104. The GUI 700 of FIG. 7 includes an example daily custom EPG 710, an example start listening button 720, an example stop listening button 722, example action buttons 730-740, and an example quit button 750. The example action buttons of the GUI 700 include an example reminder button 730, an example details button 732, an example suggestions button 734, an example EPG button 736, an example record button 738, and an example list of shows button 740.

The example daily custom EPG 710 of FIG. 7 shows a schedule of programs (e.g., Law & Order, CSI, etc.) and program information (e.g., CH 32, Season 2, 19/32, etc.) for corresponding programs airing on a selected day (e.g., Monday). In the illustrated example of FIG. 7, the program and/or timeslots may be highlighted in the daily custom EPG 710 (e.g., 8 PM time slot) and/or selected by a user touching the program names and/or timeslots, respectively. In the illustrated example of FIG. 7, once highlighted, additional program information and/or functions may be retrieved and/or implemented using the action buttons 730-740.

The example start listening button 720 and stop listening button 722 of the GUI 700 of FIG. 7 initiates and ends the instructions of FIGS. 4 and/or 5, respectively. In the illustrated example, when a user touches the start listening button 720, the user interface 230 of FIG. 2 instructs the collector 222 to begin collecting identifying information (e.g., metadata, signatures, codes, watermarks, etc.). In some examples, the user interface 230 instructs the monitor 224 to track the length of time consumer electronics device that identifying information associated with a certain program is collected. In some examples, the example monitor 224 uses the timer or clock 260 of the consumer electronics device 104 to monitor the length of time. In some examples, the monitor 224 tracks identifying information for a certain period of time, and determines if a certain percentage of the identifying information is associated with the same media (e.g., television program. The example monitor 224 may monitor the location of the consumer electronics device 104 using the GPS receiver 270 and/or based on communication with wireless access points, cellular base stations, etc. In the illustrated example of FIG. 7, when a user touches the stop listening button 722, the user interface 230 instructs the meter 220 to stop collecting the identifying information. In the illustrated example of FIG. 4, at block 490 the meter 220 responds to selection of the stop listening button 722 that the collector 222 by ceasing collection of identifying information. The instructions 400 of FIG. 4 then end.

Figure 8:
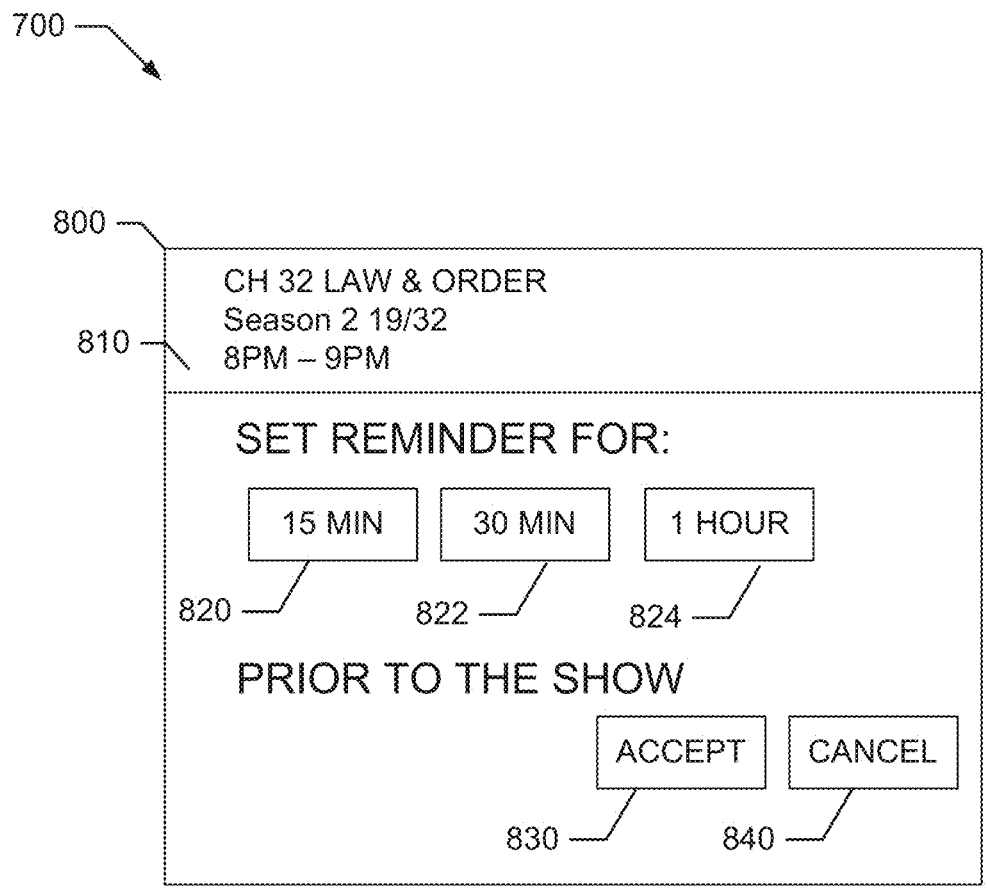

In the example of FIG. 7, the GUI 700 presents an example reminder interface (e.g., the reminder interface 800 of FIG. 8) when the example reminder button 730 is selected. In the example of FIG. 8 a user is able to set a reminder for future viewings of a program selected from the custom EPG 710. In the illustrated example of FIG. 8, the reminder interface 800 includes header 810, example reminder buttons 820, 822, 824, an example accept button 830, and an example cancel button 840.

In the illustrated example of FIG. 8, the example header 810 displays program information associated with the selected program. When at least one of the reminder buttons 820, 822, 824 are selected and the accept button 830 is touched, an example controller 210 of the consumer electronics device 104 uses the timer 260 to notify the user via the user interface 230 that a corresponding program is going to air 15 minutes, 30 minutes, or one hour before the program begins, respectively. In some examples, the reminder buttons may be modified, added, or removed. When the user touches the cancel button 840, the controller 210 no longer notifies the user of the upcoming viewing for the selected program.

In the example of FIG. 7, the GUI 700 presents an example description interface (e.g., the example description interface 900 of FIG. 9) when the example details button 732 is selected. The example description interface 900 of FIG. 9 displays a description of a program selected from the custom EPG 710. In the illustrated example of FIG. 9, the description interface 900 includes a header 910 and description field 920.

Figure 9:
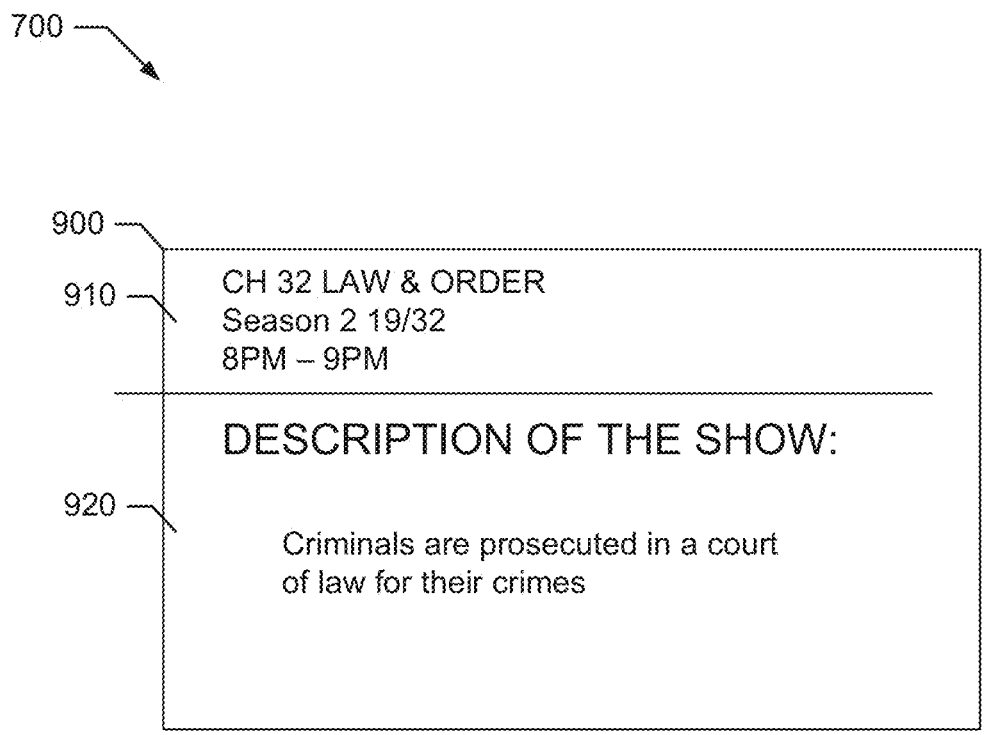

In the illustrated example of FIG. 9, the example header 910 displays program information associated with the selected program. The example description field 920 displays detailed program information. In some examples, the detailed program information may include a description of the program, a summary of an episode of the selected program, cast of the program, and/or credits of the program. In the illustrated example of FIG. 9, the controller 210 retrieves the program information for the header 910 and the detailed program information for the description field 920 from example program database 250 and/or example database 126.

In the example of FIG. 7, the GUI 700 presents an example suggestions interface (e.g., the example suggestions interface 1000 of FIG. 10) when the example suggestions button 734 is selected. The example suggestions interface 1000 of FIG. 10 displays program information of similar and/or related programs to the program selected from the custom EPG 710. In the illustrated example of FIG. 10, the suggestions interface 1000 includes an example header 1010, example related program selections 1020, 1022, 1024, an example accept button 1030, and an example cancel button 1040.

Figure 10:
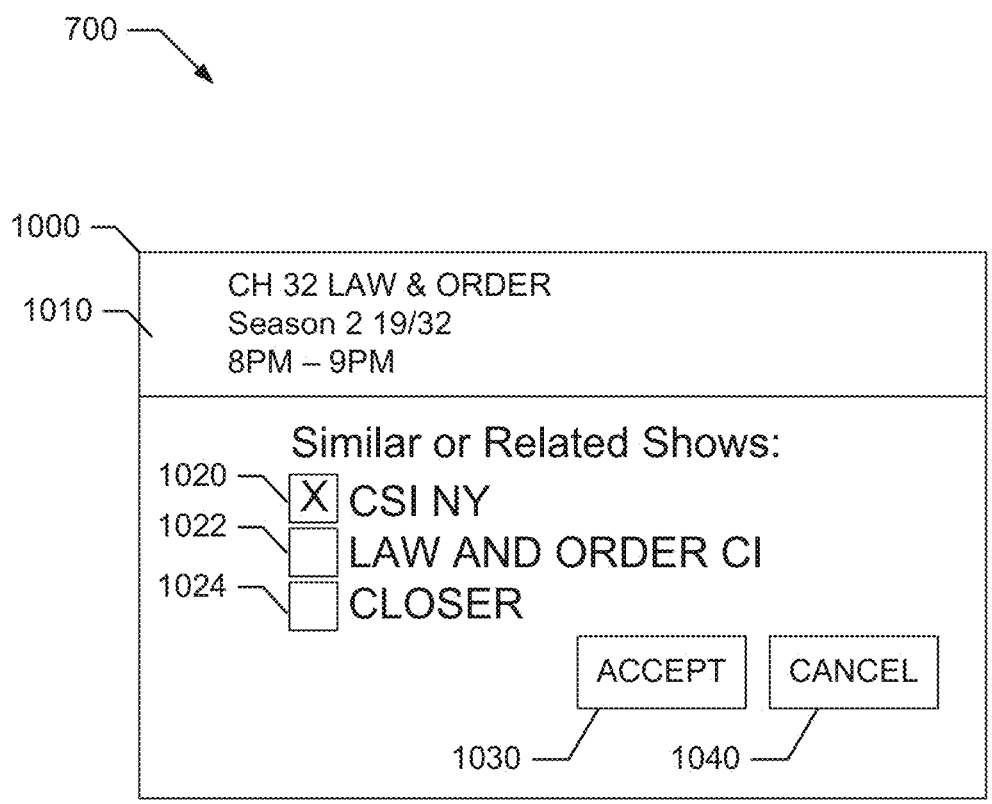

In the illustrated example of FIG. 10, the example header 1010 displays program information for similar and/or related programs of the selected program. When the suggestions button 734 of FIG. 7 is selected, the controller 210 of the consumer electronics device 104 retrieves program information of programs similar to and/or related to the selected program from the program database 250 and/or the database 124 of the central data facility 120. In some examples, program information of the selected program is correlated with program information of similar and/or related programs in the program database 250 and/or the database 124. In the illustrated example, a selected program may be similar to or related to other programs based on genre, cast members, production companies, time eras, audiences, demographics, channel numbers, etc. In some examples, the suggested programs are based on profile information of the user (e.g., demographics, location, etc.)

The example controller 210 retrieves the program information of the similar programs and displays the related program information (e.g., the related program name of the selections 1020, 1022, 1024) via the user interface 230 consumer electronics device. In the illustrated example of FIG. 10, the controller 210 identified and retrieved the selections 1020 (CSI NY), 1022 (Law & Order CI), 1024 (CLOSER) because they were in the same genre as the selected program (Law & Order) shown in the header 910. In some examples, the user may select the related program selections 1020, 1022, 1024 (denoted by "X" in the illustrated example) to add the corresponding program to the custom EPG 710.

In the illustrated example of FIG. 10, if one or more related program selections are selected, the controller 210 instructs the program guide generator 240 to include program information associated with the selected related programs. The program guide generator 240 then updates and generates the custom EPG with the corresponding program information.

In the example of FIG. 7, when selected, the EPG button 736 displays alternate versions of the custom EPG 710. In some examples, the alternate versions of the EPG include weekly and or monthly versions of the EPG. In some examples, the alternate versions of the EPG include more detailed program information (e.g., display program description, related program information, etc.). In some examples, alternate versions of the EPG include images associated with the programs of the EPG, etc. In some examples, the alternate versions of the EPG include a service provider EPG listing all programs provided by the corresponding service provider (e.g., a cable service provider, satellite television service provider, satellite radio provider, etc.).

In the example of FIG. 7, when selected, the record button 738 instructs an example digital video recorder (e.g., a recorder of the STB 108) in communication with or at least accessible to the consumer electronics device 104 to record a selected program. When a user touches the record button 738, the controller 210 instructs the example STB 108 via example network 110 to record the selected program.

In the example of FIG. 7, when selected, the list of shows button 740 displays the programs included in the custom EPG. An example list of shows may be stored in the program database 250 and/or the database 124. When the button 740 is touched, the controller 210 retrieves the example list of shows from the program database 250 and/or the database 124. In some examples, the list of shows includes all programs included in the custom EPG. In some examples, the list of shows includes programs that will be airing in a certain time period, such as on the corresponding day, corresponding week, etc. In the illustrated example of FIG. 7, the controller 210 displays the list of shows via the user interface 230 of the consumer electronics device 104.

In the example of FIG. 7, when selected, the quit button 750 closes the GUI 700 and/or the custom EPG application. In response to the selection of the quit button 750, the example controller 210 of the consumer electronics device 104 instructs the user interface 230 to stop displaying the GUI 700. In some examples, a user is prompted for authorization to close the GUI 700.

FIGS. 11-18 illustrate a second example GUI 1100 that may be implemented by the consumer electronics device 104 of FIGS. 1 and/or 2 to navigate an example custom EPG for media such as television programs, radio programs, Internet programs, etc. The example GUI 1100 of FIGS. 11-17 may be implemented by the program guide generator 240 and displayed via the user interface 230 (e.g., a display, touchscreen, etc.) of the consumer electronics device 104 and/or a display device connected to the user device (e.g., a television, a monitor, etc.). In the illustrated example of FIG. 11, the GUI 1100 is displayed and/or controlled using an example touchscreen of the consumer electronics device 104. In some examples, the GUI 1100 may be displayed and/or controlled using one or more media presentation devices (e.g., the television 106, the STB 108, a computer, a laptop computer, a tablet computer, etc.). The GUI 1100 of FIG. 11 includes an example main header 1102 and an example tab display 1120.

The example main header 1110 of FIGS. 11-18 is accessible while the custom EPG is being accessed by the consumer electronics device 104. The example main header 1110 includes example universal control button areas 1112, 1114, an example title header 1116, and an example listen button 1118. In the illustrated example of FIGS. 11-18, the universal control button areas 1112, 1114 include two example buttons and three example buttons, respectively. The buttons in the universal control button areas 1112, 1114 enable a user to control and/or access other functions of the consumer electronics device 104 (e.g., access applications, menus, messages, etc.). In some examples, the universal control button areas 1112, 1114 can be configured to have buttons for control of applications or functions for the custom EPG (e.g., quit, zoom, etc.) and/or consumer electronics device 104. In some examples, the universal buttons in the areas 1112, 1114 are programmable or reconfigurable to have custom functionality.

In the illustrated example of FIGS. 11-18, the example title header 1116 of the GUI 1100 displays a custom EPG title (e.g., "My TV") and an example control menu button 1117. The example control menu button 1117, when activated, instructs the GUI 1100 to display an example control menu, such as the example control menu described herein with respect to FIG. 17.

In the illustrated example of FIGS. 11-18, the example listen button 1118 enables a user to control (e.g., activate/deactivate) the listening function of the metered consumer electronics device 104. In the illustrated example of FIGS. 11-18, when a user activates the listen button 1118, the user interface 230 of FIG. 2 instructs the meter 220 to instruct the collector 222 to begin collecting identifying information (e.g., metadata, signatures, codes, watermarks, etc.).

In the example GUI 1100 of FIGS. 11-18, when the listen button 1118 is selected a second time, the user interface 230 instructs the collector 222 to stop collecting the identifying information.

The example GUI 1100 in FIGS. 11-16 uses the example tab display 1120 to allow a user to navigate among different features of the generated custom EPG displayed on the tabs 1122, 1124, 1126. The tab display 1120 features three tabs: the MyTV tab 1122, the My EPG tab 1124, and the EPG tab 1126. The example MyTV tab 1122 enables a user to navigate the custom EPG, in particular by enable viewing the list of scheduled programs included in the custom EPG in a daily display (e.g., see FIG. 11) and/or a weekly display (e.g., see FIG. 12). In some examples, other time periods may be used in the MyTV tab 1122. The example My EPG tab 1124 enables a user to see a list of channels associated with programs used in generating the custom EPG, as described herein, (e.g., see FIG. 14) or a list of shows on an example channel to be added to the custom EPG (e.g., see FIG. 15). The example EPG tab 1126 enables a user to browse an EPG for a service provider, for example, a cable service provider or satellite television service provider (e.g., see FIG. 16).

Figure 11:
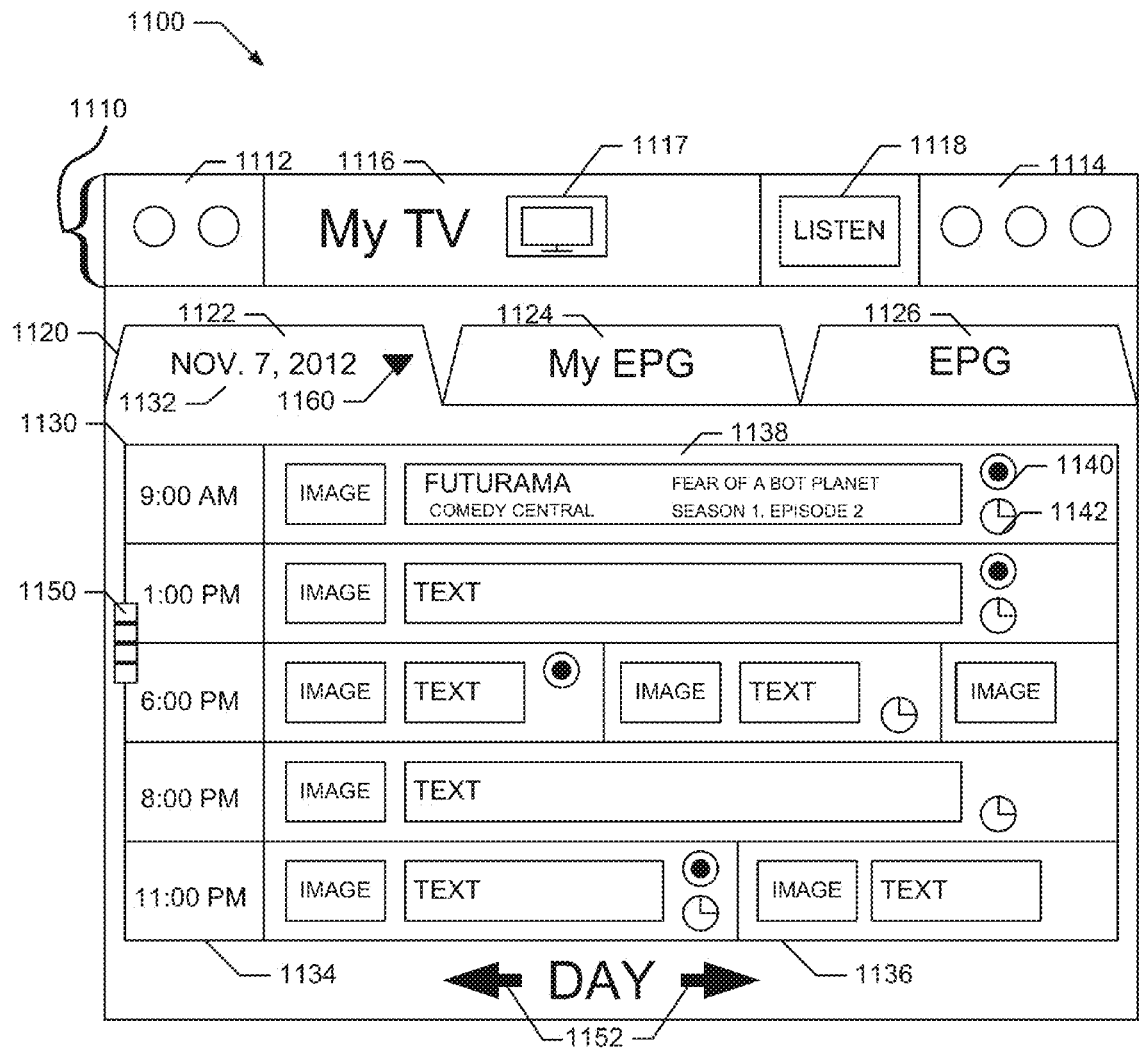
FIGS. 11-18 illustrate a second example GUI that may be implemented by the example meter of FIG. 1 and/or the example consumer electronics device of FIG. 2.

In the illustrated example of FIG. 11, the MyTV tab 1122 displays a custom EPG 1130 arranged daily. In some examples, when the custom EPG 1130 is selected, the MyTV tab 1122 is the "home screen" of the GUI 1100 (i.e., the screen that is displayed when the custom EPG application is opened on the consumer electronics device 104). When selected, the MyTV tab 1122 of the illustrated example displays the current date (e.g., Nov. 7, 2012 in the illustrated example) in the tab title 1132. In some examples, the date is displayed in another location of the custom EPG 1130.

The custom EPG 1130 of FIG. 11 includes an example time column 1134 and a program column 1136. The example time column 1134 of FIG. 11 displays the time that a corresponding program in the program column 1136 is going to air, although times when programs are not being aired may also be displayed. The program column 1136 includes one or more program fields. In the illustrated example, program field 1138 includes programming information for television program FUTURAMA that is to air at 9:00 AM of Nov. 7, 2012. The example program field 1138 displays program information (e.g. program name "FUTURAMA," channel information "Comedy Central", episode details "Fear of a Bot Planet," "Season 1, Episode 2") and an image associated with the program. In some examples, the program field may be selected, and a program detail display is presented to the user (e.g., see FIG. 13).

The example program field 1138 may include a record indicator 1140 or a reminder indicator 1142. The record indicator 1140 indicates that the program is set to be recorded by the STB 108 or other recording device in communication with the consumer electronics device 104. The reminder indicator 1142 indicates that a reminder is set for the program to alert a user via the consumer electronics device 104 or any other device in communication with the consumer electronics device 104.

The example GUI 1100 of FIG. 11 includes an example scroll tab 1150 and example scroll arrows 1152 enable a user to navigate the custom EPG 1130. The scroll tab 1150 scrolls up and down to enable a user to see the programs that will be airing throughout the displayed day. The scroll arrows 1152 navigate the custom EPG 1130 to the previous day or next day to enable a user to see the programs that will be airing on the corresponding day. In some examples, the GUI 1100 includes functions to allow a user to swipe up, down, left, or right to navigate the custom EPG 1130 as an alternative or in addition to the scroll bar 1150 and/or scroll arrows 1152.

Figure 12:
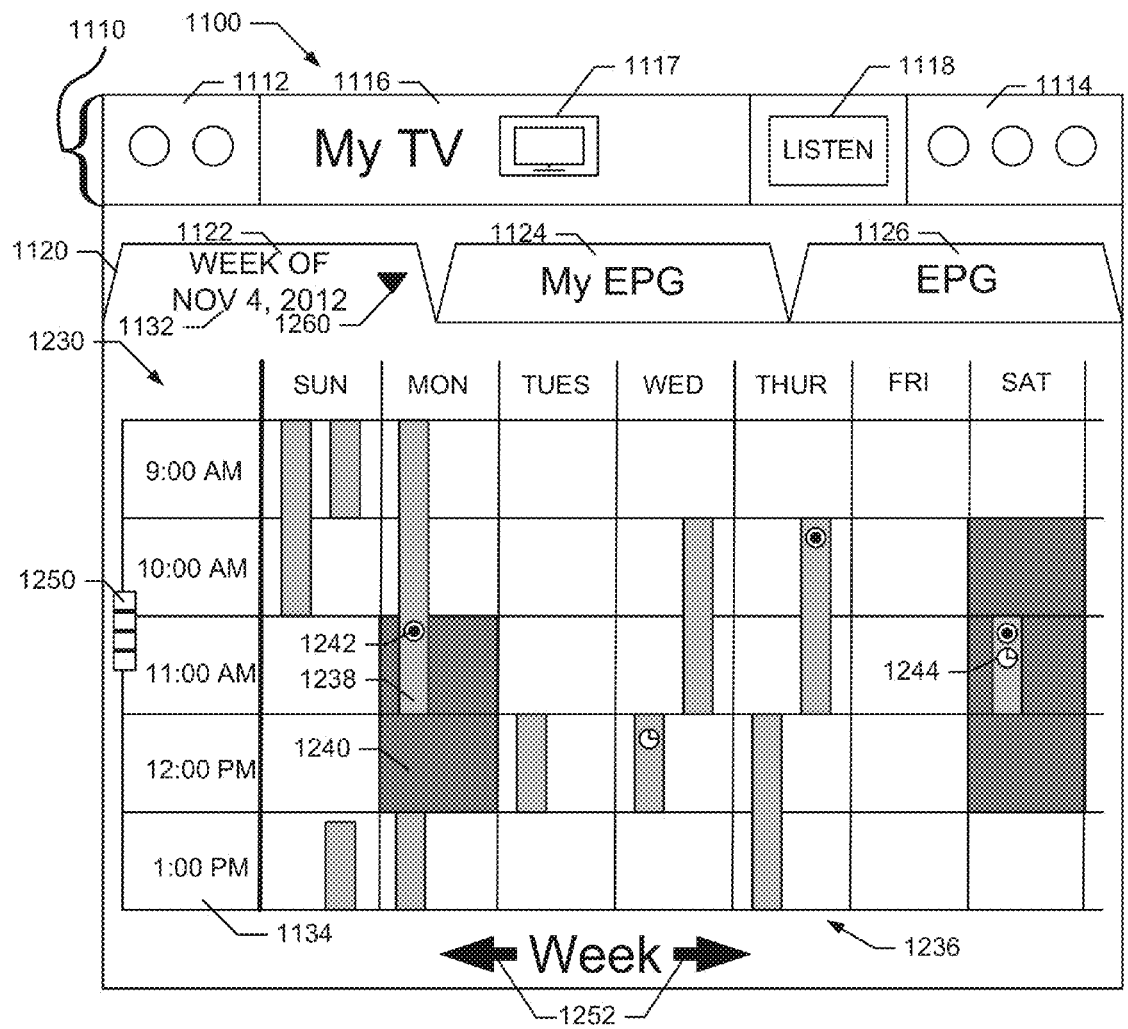

The example GUI 1100 of FIG. 11 includes a selector button 1160 that may be used to change the settings of the custom EPG 1130. For example, the selector button 1160 is used to change the custom EPG 1130 from daily view (as shown in FIG. 11) to weekly view (as shown in FIG. 12). In some examples, the selector button 1160 may be used to navigate the custom EPG 1130 to another day or any other similar function.

In the illustrated example of FIG. 12, the MyTV tab 1122 displays a custom EPG 1230 arranged weekly. In some examples, the MyTV tab 1122 with the custom EPG 1230 selected is the "home screen" of the GUI. When selected, the MyTV tab 1122 of the illustrated example displays the current week (e.g., the week of Nov. 7, 2012 in the illustrated example) in the tab title 1232. In some examples, the date is displayed in another location of the custom EPG 1230.

The custom EPG 1230 of FIG. 12 includes an example time column 1234 and day columns 1236 to create a calendar grid. The time column 1234 is arranged in hourly increments, and the day columns are arranged by days of the week, although other arrangements may be implemented.

In the illustrated example of FIG. 12, light shaded program indicators indicate when a program is going to air. For example, a program indicator 1238 indicates that a program will air on Monday, Nov. 5, 2012 from 9:00 AM until 12:00 PM. In the illustrated example of FIG. 12, dark shaded appointment indicators indicate when a user associated with the consumer electronics device 104 has a scheduled appointment. For example, an appointment indicator 1240 indicates that the user has an appointment scheduled for Monday, Nov. 5, 2012 from 11:00 AM until 1:00 PM. In some examples, the consumer electronics device 104 has a functioning calendar that may be accessed by the GUI 1100 to populate time slots with an appointment indicator (e.g., the appointment indicator 1140) when the user has an appointment. In some examples, the user may enter appointments using the GUI 1100. In some examples, selecting a program indicator or appointment indicator will open a program detail display (e.g., see FIG. 13) or appointment detail display, respectively.

In some examples, the controller 210 of the consumer electronics device 104 may be used to automatically detect timing conflicts. In some such examples, if the controller 210 determines that a program in the user's custom EPG 1230 is scheduled to air during a user's appointment, the controller 210 instructs the STB 108 or other similar recording device to record the scheduled program. To this end, the controller 210 may interact with the application programming interfaces (APIs) or other interfaces of the recording device(s). In the illustrated example, the program indicator 1238 includes a recording indicator 1242 to show that the program is being recorded. In some examples, a reminder can be set and indicated using a reminder indicator, such as reminder indicator 1244.

The example GUI 1100 of FIG. 12 includes an example scroll tab 1250 and example scroll arrows 1252 enable a user to navigate the custom EPG 1230. The scroll tab 1250 scrolls up and down to enable a user to navigate the time of the week. The scroll arrows 1252 navigate the custom EPG 1230 to a past week or a future week to enable a user to see any program and/or appoints scheduled for the week. In some examples, the GUI 1100 includes functions to allow a user to swipe up, down, left, or right to navigate the custom EPG 1230 as an alternative or in addition to the scroll bar 1250 and/or scroll arrows 1252.

The example GUI 1100 of FIG. 12 includes a selector button 1260 that may be used to change the settings of the custom EPG 1230. For example, the selector button 1260 is used to change the custom EPG 1230 from weekly view (as shown in FIG. 12) to daily view (as shown in FIG. 11). In some examples, the selector button 1260 may be used to navigate the custom EPG 1230 to another day or any other similar function.

Figure 13:
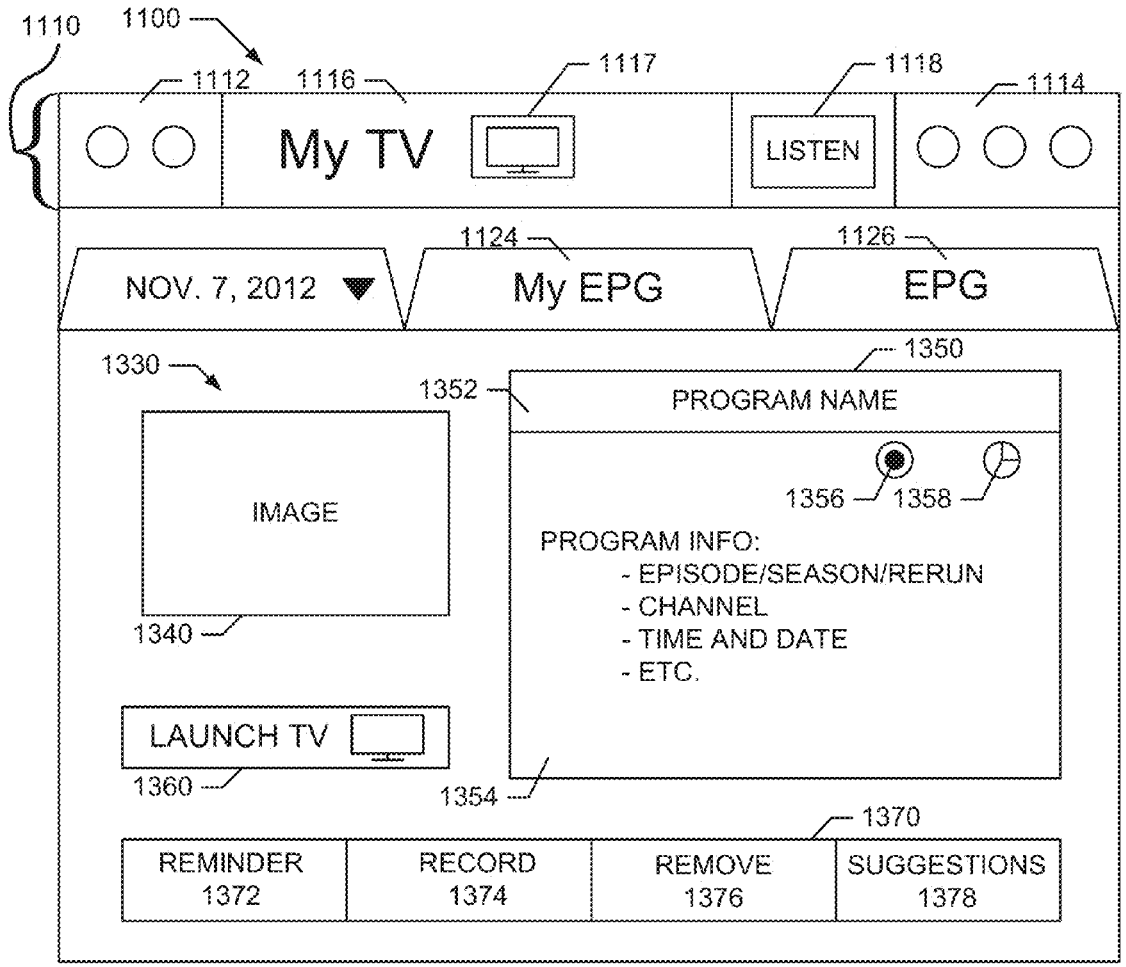

In FIG. 13, the example GUI 1100 displays an example program detail display 1330. In some examples, the program detail display 1330 is presented by the GUI 1100 when a user selects a program presented by the GUI 1100. In some examples, the program detail display 1330 is presented when a collector (e.g., the collector 222) of the consumer electronics device 104 collects identifying information (e.g., metadata, signatures, codes, watermarks, etc.) associated with the program. When the program detail display 1330 is activated, the GUI 1100 retrieves the program detail information from the database 250, consumer electronics device 104, and/or the database 124. The program detail display 1330 includes an example program image 1340, program information display 1350, television launch button 1360, and program action bar 1370.

The example program image 1340 depicts an image in association with the selected program of the program detail display 1330. In some examples, the program image 1340 depicts a character or actor on the television 106 when the program is airing and the program detail display 1330 is opened. In some examples, a user is able to edit, change, and/or remove the image 1340. The program information display 1340 of the illustrated example displays program information associated with the selected program. In the illustrated example, the program information display 1330 includes a program header 1352 and a program information field 1354. In the illustrated example, the program header 1352 of the illustrated example displays the program name. The program information field 1354 of the illustrated example displays the program information (e.g., episode information, channel information, time and date of the program, etc.). In some examples, the program information field 1354 includes descriptive information of a scene of the program (e.g., an actor, scene, background information, character, shooting location, etc.) being presented if the program detail display 1330 is open while the program is airing. In the illustrated example, the program information field 1354 includes a record indicator 1356 and/or a reminder indicator 1358 to indicate whether one or more corresponding programs are set to record and/or an alarm is set for the one or more corresponding programs.

The example television launch button 1360 of FIG. 13 enables a user to view the program described in the program detail display 1330. When the television launch button 1360 is selected, the controller 210 of the consumer electronics device 104 instructs one or more presentation device(s) to tune to the program. In some examples, the example controller 210 instructs the user interface 230 to present the program. In the illustrated example, the controller 210 sends a message to another device (e.g. the television 106, the STB 108, etc.) associated with the consumer electronics device 104 via a network to launch the program. In some examples, a user of the consumer electronics device 104 is capable of controlling the program playback on the other example devices using the GUI 1100. In such examples, the GUI 1100 may include remote control functionality to enable the consumer electronics device 104 to control the television via a network (e.g., the network 110, such as a LAN, digital living network alliance (DLNA) network, etc.), infrared sensor, optical sensor, etc.

The example program action bar 1370 of FIG. 13 includes an example reminder button 1372, an example record button 1374, an example remove button 1376, and an example suggestions button 1378. When selected, the reminder button 1372 sets an alarm indicating that the program presented on the program detail display 1330 is airing. In some examples, the alarm is presented by the user interface 230 of the consumer electronics device 104. In some examples, the reminder is presented to the user via other devices associated with the consumer electronics device 104 (e.g., the television 106, the STB 108, etc.).

The example record button of FIG. 13 enables a user to record the program of the program detail display 1330. When the record button 1374 is selected, the consumer electronics device 104 instructs one or more media presentation devices (e.g., the STB 108, a DVR, a smart television, etc.) associated with the consumer electronics device 104 to record the program when it airs. In some examples, the consumer electronics device 104 is associated with media presentation devices via a network (e.g., the network 110).

The example remove button 1376 of FIG. 13 enables a user to delete the program of the program detail display 1330 from the example custom EPG (e.g. the custom EPG's 1130, 1230, etc.). In some examples, when the remove button 1376 is selected, the consumer electronics device 104 erases corresponding program information from the database 250 and/or the database 124.

The example suggestions button 1378 of FIG. 13 enables a user to view programs related to the program of the program detail display 1330. When the suggestions button 1378 is selected, the consumer electronics device 104 retrieves program information of similar and/or related programs stored in the database 250 and/or the database 124. In the illustrated examples, the program information for the similar and/or related programs is displayed to a user via the GUI 1100. In some examples, the related programs are presented in a similar manner as the program detail display 1330.

Figure 14:
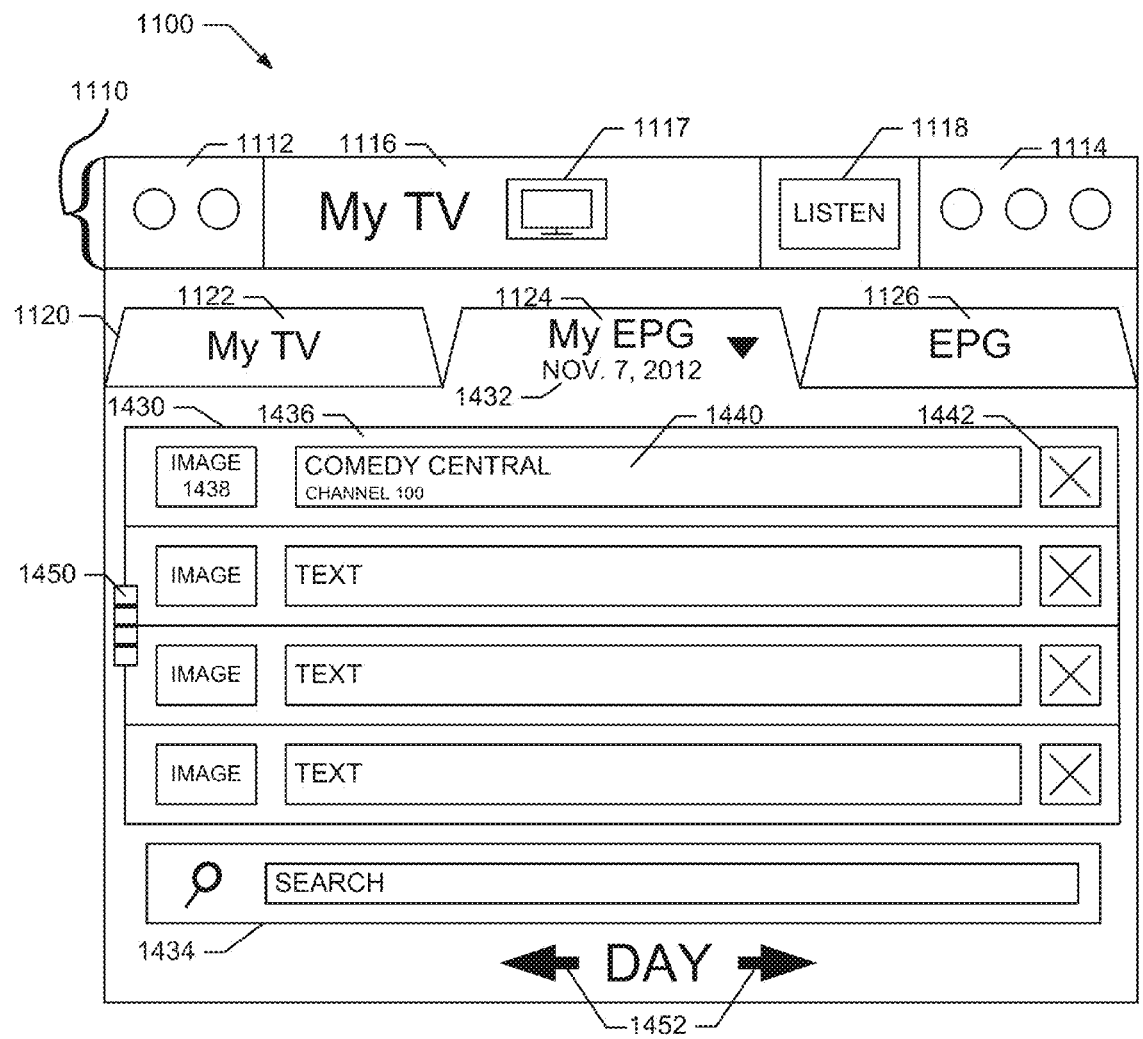

In the illustrated example of FIG. 14, the My EPG tab 1124 displays a list of channels 1430 associated with programs included in an example custom EPG (e.g., the custom EPG's 1130, 1230). The example My EPG tab 1124 includes an example date display 1432 corresponding to a date that the list of channels 1430 are scheduled to air (e.g., Nov. 7, 2012). In some examples, the channel list 1430 displays all channels associated with programs in the custom EPG. The My EPG tab 1124 also includes an example search bar 1434 to enable a user to search for channels and/or programs in the custom EPG.

The example channel list 1430 of FIG. 14 includes a number of channel fields, for example, a channel field 1436, that present corresponding channel information to a user. The example channel field 1436 includes an example channel image 1438, an example channel information field 1440, and an example remove button 1442. The example channel image 1438 is associated with an example channel presented in the channel information field 1440, and may include an icon designating the channel, an image of an actor, character, etc. In some examples, the user may edit the channel image 1438.

The example channel information field 1440 of FIG. 14 presents channel information, for example the channel name, "Comedy Central," and channel number, "Channel 100." The example remove button 1442 of the channel field 1436 allows a user to remove the channel, and any programs associated with the channel from the user's custom EPG (e.g. the custom EPG's 1130, 1230). In some examples, when the remove button 1442 is selected, if the consumer electronics device 104 collects identifying information from a program aired on the corresponding channel, the program associated with the identifying information will not be included in the custom EPG. In some examples, if the remove button 1442 is selected, a prompt will request the user to confirm removal of the channel and/or programs associated with the channel from the custom EPG.

The example GUI 1100 of FIG. 14 includes an example scroll tab 1450 and example scroll arrows 1452 enable a user to navigate the channel list 1430. The scroll tab 1450 scrolls up and down the channel list 1430. The scroll arrows 1452 of the illustrated example enable the user to navigate the channel list 1430 to a past day or a future day to enable a user to see channels associated with programs airing on the corresponding day. In some examples, the GUI 1100 includes functions to allow a user to swipe up, down, left, or right to navigate the channel list 1430 as an alternative or in addition to the scroll bar 1450 and/or scroll arrows 1452.

Figure 15:
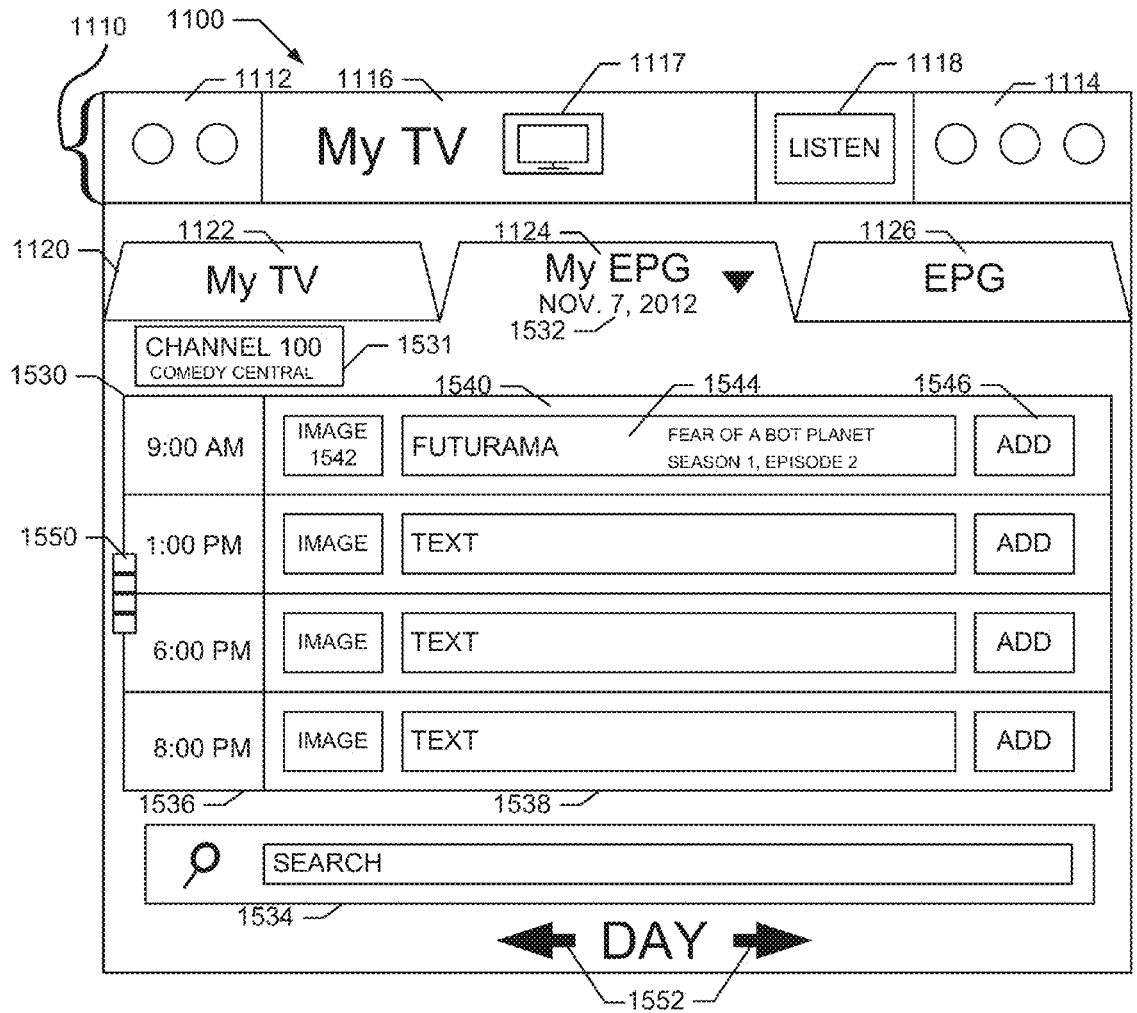

In the illustrated example of FIG. 15, the My EPG tab 1124 displays a list of programs 1530 that may be used or selected to generate an example custom EPG (e.g., the custom EPG's 1130, 1230). The example My EPG tab 1124 includes a channel field 1531 to identify the channel on which the programs in the list of programs 1530 will air. The My EPG tab 1124 includes a date display 1532 to indicate a date on which the programs of the program list 1530 are airing on a given day (e.g., Nov. 7, 2012). In some examples, the program list 1530 displays all programs available to be used to generate the custom EPG regardless of the channel or date (e.g., by alphabetical order, chronological order, etc.). The My EPG tab 1124 also includes a search bar 1534 to enable a user to search for channels and/or programs in the custom EPG.

The example channel list 1530 of FIG. 15 includes a time column 1536 and a program column 1538. The example time column 1536 displays the time(s) when corresponding program(s) are scheduled to air or have aired. The example program column 1538 includes a number of program fields, for example, a program field 1540, that present corresponding program information to a user. The example program field 1540 includes an example program image 1542, an example program information field 1544, and an example add button 1546. The example program image 1542 is associated with an example program presented in the program information field 1544, and may include an icon designating the channel, an image of an actor, character, etc. In some examples, the user may edit the channel image 1542.

The example program information field 1544 of FIG. 15 presents program information, for example, a program name ("Futurama"), a channel name ("Comedy Central"), and/or episode information ("Fear of a Bot Planet Season 1, Episode 2"). The example add button 1546 of the program field 1540 allows a user to add the program in the program field 1540 to the custom EPG. In some such examples, the controller 210 instructs the program generator 204 to include the corresponding program information in the custom EPG. In some examples, if the add button 1546 is selected, a prompt will request the user to confirm the addition of the program to the custom EPG.

The example GUI 1100 of FIG. 15 includes an example scroll tab 1550 and example scroll arrows 1552 enable a user to navigate the program list 1530. The scroll tab 1550 scrolls up and down the program list 1530. The scroll arrows 1552 of the illustrated example enable the user to navigate the program list 1530 to a past day or a future day to enable a user to see programs associated with the channel of channel display 1531 airing on the corresponding day. In some examples, the GUI 1100 includes functions to allow a user to swipe up, down, left, or right to navigate the program list 1530 as an alternative or in addition to the scroll bar 1550 and/or scroll arrows 1552.

Figure 16:
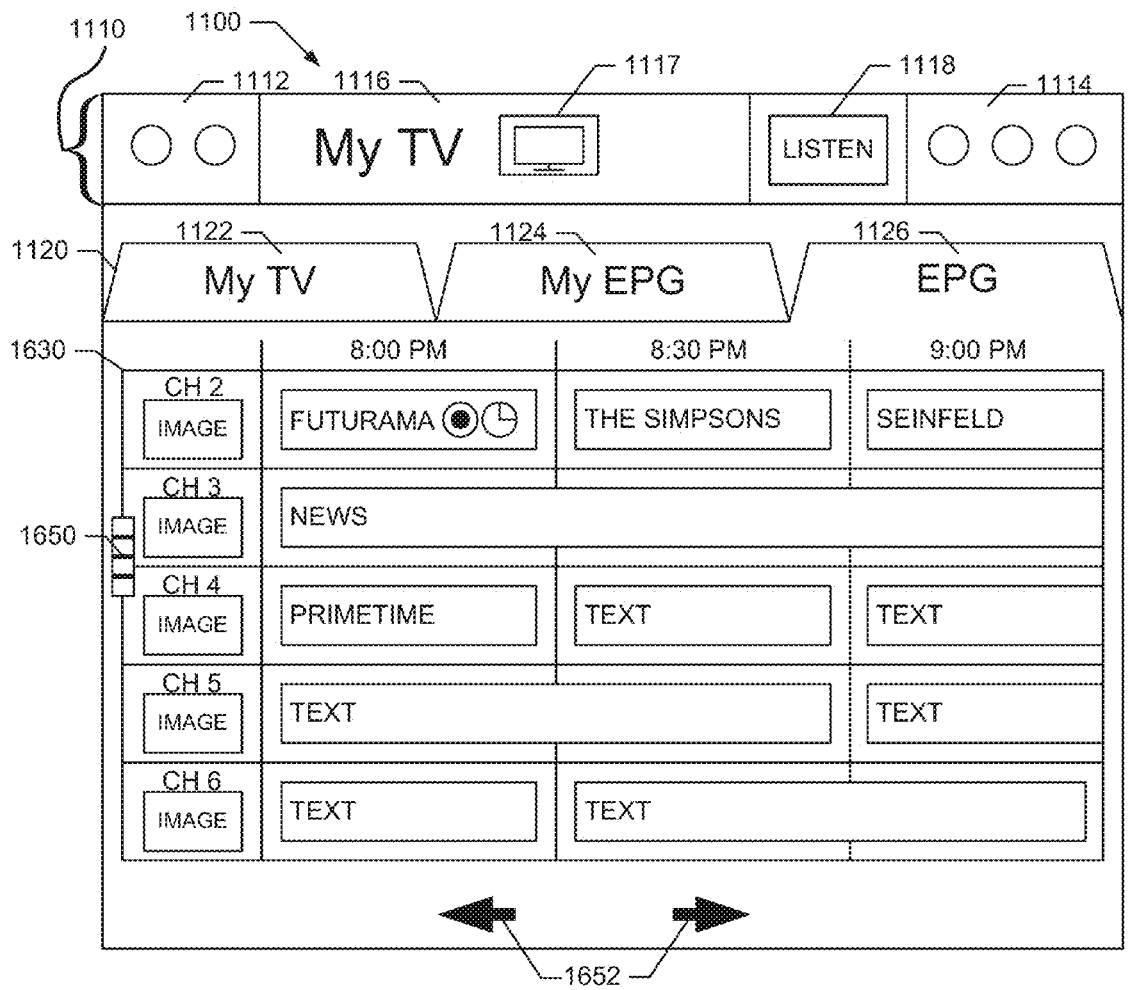

In the illustrated example of FIG. 16, the EPG tab 1126 displays an example EPG 1630 associated with a service provider (e.g., a cable service provider, a satellite television provider, satellite radio provider, etc.). The example EPG 1630 is presented to the user via the GUI 1100. The illustrated example of the EPG 1630 is an example, and may take the appearance of any EPG generated by any service provider. In some examples, the EPG is generated by the consumer electronics device 104 and/or a device associated with the consumer electronics device 104 (e.g., the STB 108, the television 106, etc.). In some examples, the EPG 1630 is generated from display data stored in a database of a service provider STB (e.g., the STB 108 of FIG. 1). In some examples, the EPG 1630 is generated from display data stored in consumer electronics device the database 250 and/or the database 124.

The example GUI 1100 of FIG. 16 includes an example scroll tab 1650 and example scroll arrows 1652 enable a user to navigate the EPG 1630. The scroll tab 1650 scrolls up and down the EPG 1630. The scroll arrows 1652 of the illustrated example enable the user to navigate the EPG 1630 to a past day or a future day to enable a user to see programs. In some examples, the GUI 1100 includes functions to allow a user to swipe up, down, left, or right to navigate the EPG 1630 as an alternative or in addition to the scroll bar 1650 and/or scroll arrows 1652.

Figure 17:
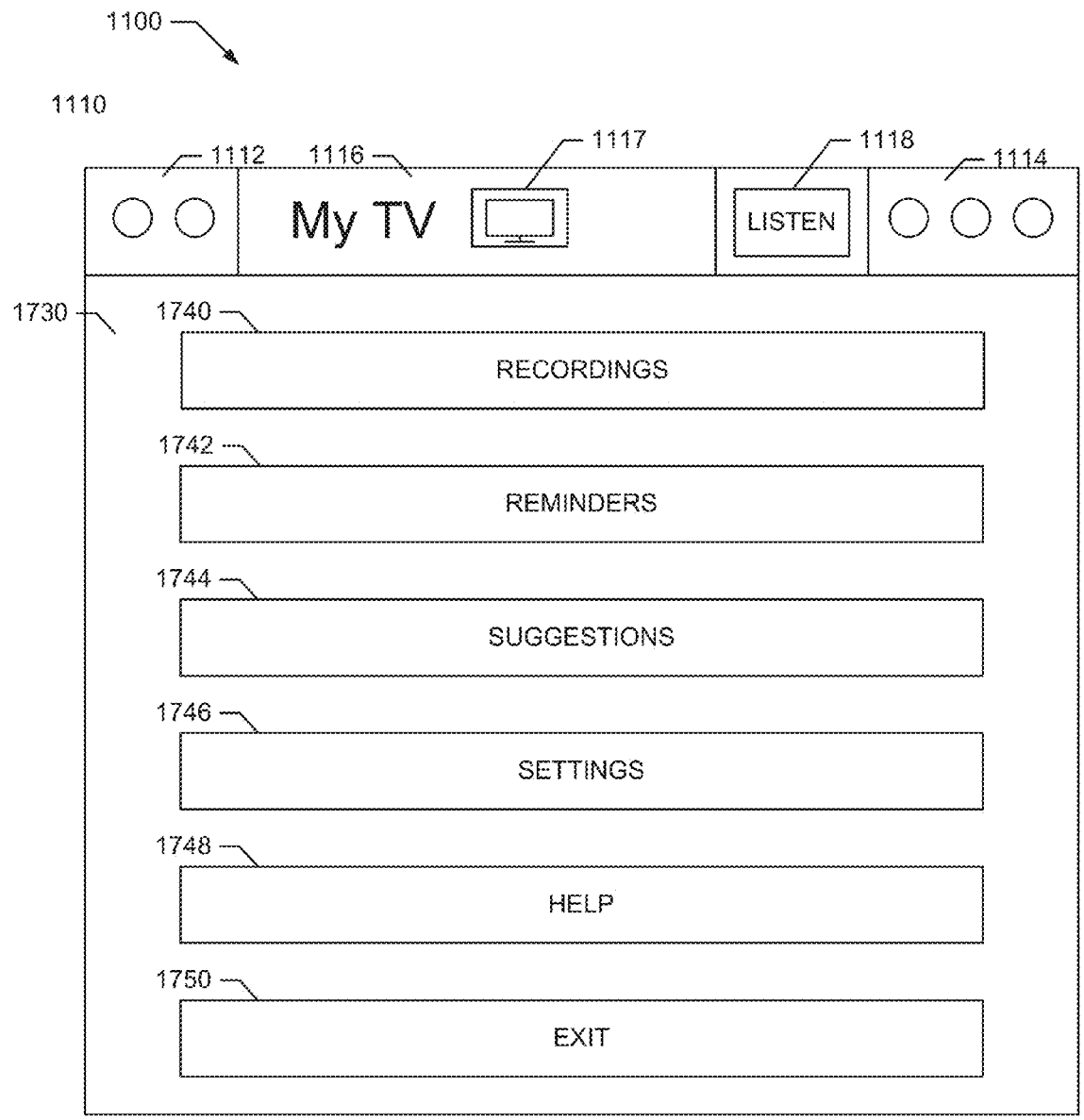

FIG. 17 illustrates an example main menu 1730 presented by the GUI 1100. The example main menu 1730 is presented when a user selects the main menu button 1117 in the title header 1116. The main menu 1730 includes an example recordings button 1740, an example reminders button 1742, an example suggestions button 1744, an example settings button 1746, an example help button 1748, and an example exit button 1750. The main menu 1730 enables a user to navigate and/or edit various features of an example GUI 1100 and/or consumer electronics device 104.

The example recordings button 1740 of FIG. 17 enables a user to navigate recordings of the STB 108, a DVR, or other similar recording device associated with the consumer electronics device 104. When the recordings button 1740 is selected, the GUI 1100 displays the recordings display 1830 of FIG. 18. The recordings display 1830 includes a tab display 1832 with an example ongoing recordings tab 1834, an example scheduled recordings tab 1836, and an example recorded programs tab 1838. The example ongoing recordings tab 1834 displays programs that are currently being recorded by the STB 108, a DVR, or other similar recording device associated with the example consumer electronics device 104. The example scheduled recordings tab 1836 displays programs that are scheduled for recording by the STB 108, a DVR, and/or other similar recording device associated with the example consumer electronics device 104. The example recorded programs tab 1838 displays programs that have been recorded by the 108 STB, a DVR, or other similar recording device associated with the example consumer electronics device 104. Each of the tabs 1834, 1836, 1838 of the illustrated example displays a corresponding recordings viewer 1840.

Figure 18:
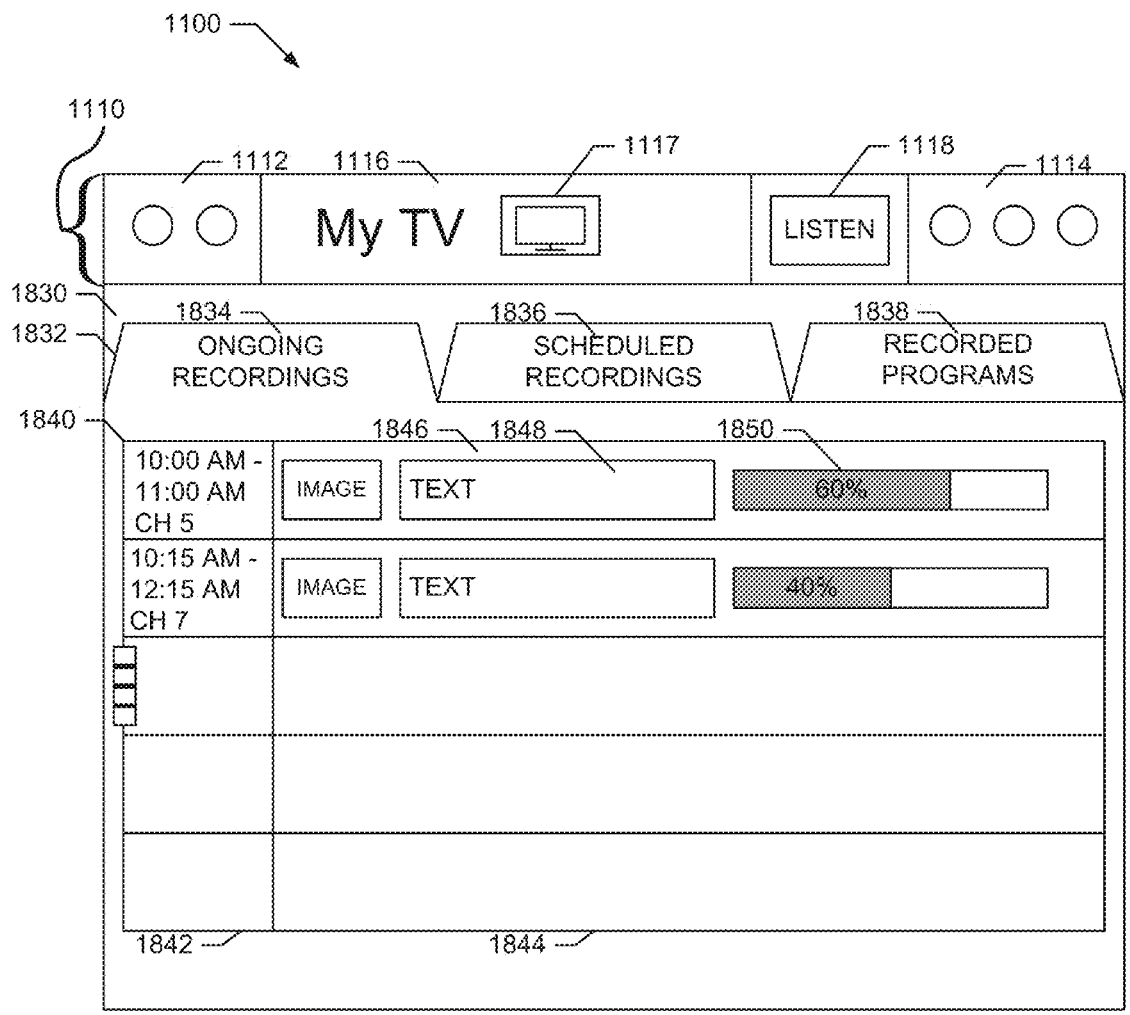

The example recordings viewer 1840 of FIG. 18 includes an example time column 1842 and an example program column 1844 with a number of program fields, for example the program field 1846. The example time column 1842 displays a time and/or channel associated with a program in the corresponding program field. The illustrated example of FIG. 18 shows a program field 1846 including program information 1848 and a status bar 1850. In the illustrated examples, the controller 210 retrieves corresponding program information to be presented in the recordings viewer 1840 by the GUI 1100. The program information 1848 may include a program name, channel information, episode information, program description, etc. In the illustrated example, a status bar 1850 indicates the status of the recording (e.g., 60% complete). In some examples, a recordings viewer 1840 of the scheduled recordings tab 1836 includes program information and the corresponding time that the program is scheduled to record. In some examples, a recordings viewer 1840 of the recorded programs tab 1838 includes program information and the corresponding time that the program was recorded.

The example reminders button 1742 of FIG. 17 enables a user to view and/or edit reminder settings for programs used in generating a custom EPG (e.g., the custom EPG's 1130, 1230). For example, the user can view whether reminders are on or off, time settings, audio/visual settings, vibration settings, etc.

The example suggestions button 1744 of FIG. 17 enables a user to view suggested programs that are similar and/or related to the programs used in generating the custom EPG (as described herein, the programs in the custom EPG are programs viewed by the user as determined by an example meter 220). In some examples, the user can set the suggestions criteria for similar or related programs. For example, suggestions are based on genre, cast members, production companies, time periods, audiences, demographics, channel numbers, etc. In some examples, the suggestions button 1744 provides an example GUI including a browser that allows the user to set the criteria for similar or related programs and/or search for similar or related programs. In some examples, the user is able to ignore suggestions provided to the user when selecting the suggestions button 1744 so that the corresponding program is no longer suggested to the user. In some examples, the user is able to view details of suggested programs (e.g., via the program detail display 1330 of FIG. 13) and/or add the suggested program to the user's custom EPG (e.g., the custom EPG's 1130, 1230).

The example settings button 1746 of FIG. 17 enables a user to view settings for the GUI 1100 and/or consumer electronics device 104. For example, the user may adjust color schemes, time settings, suggestion criteria as described herein, notification settings for reminders as described herein, and/or user profiles. For example, a user profile may include geographic location settings for the example selector 226 described herein.

The example help button 1748 of FIG. 17 enables a user to view a help screen and/or send help requests for troubleshooting. For example, the help button 1748 may access a website displaying frequently asked questions, troubleshooting tutorials, search indexes or any other similar features.

The example exit button 1750 of FIG. 17 closes the main menu 1730 on the GUI 1100, and returns the GUI to the previous screen and/or a home screen (e.g., the custom EPG's 1130, 1230).

FIGS. 11-18 are presented as examples and accordingly, the examples may be combined and/or altered.

Figure 19:
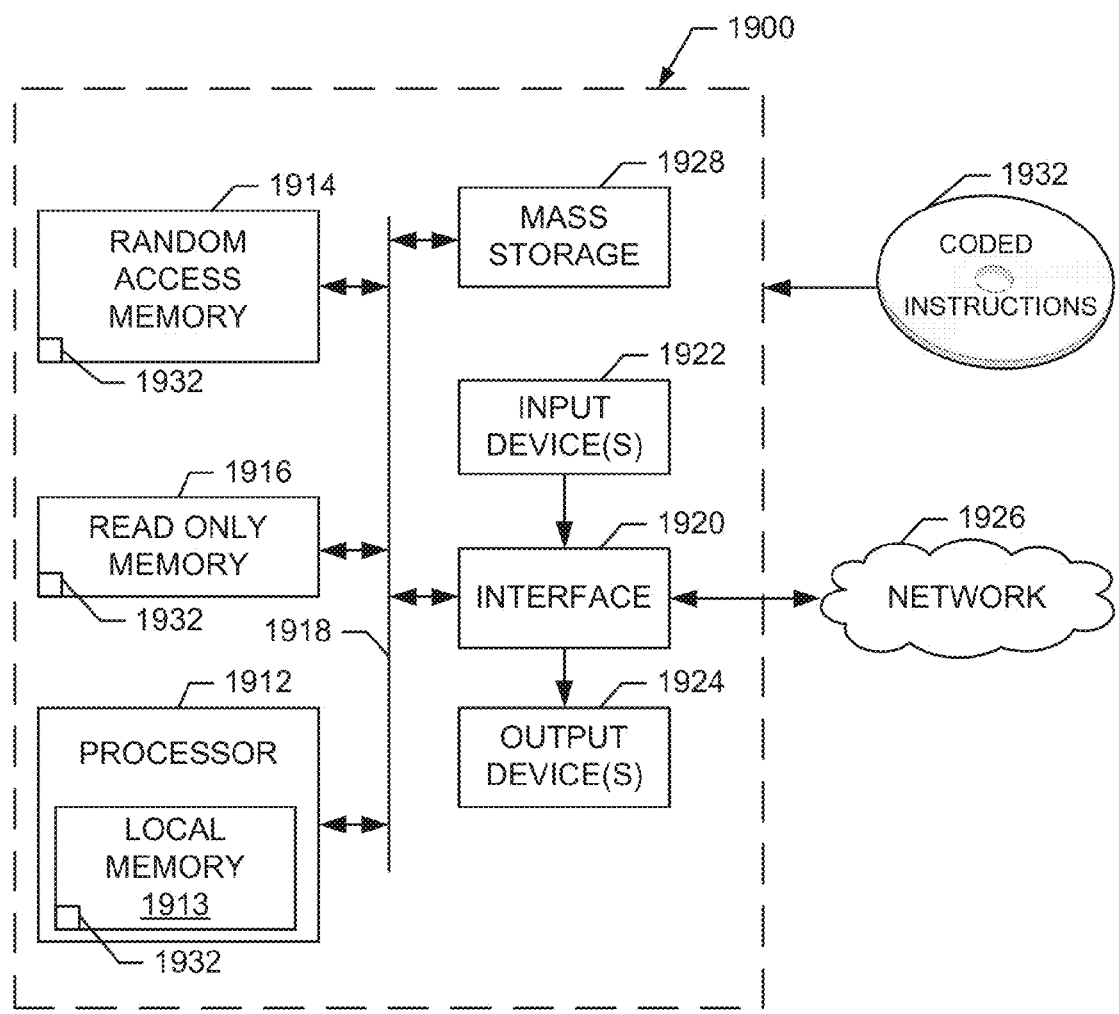
FIG. 19 is a block diagram of an example processor platform which may execute the example instructions of FIGS. 5 and/or 6 to implement the example meter and/or consumer electronics device of FIGS. 1, 2, and/or 3.

FIG. 19 is a block diagram of an example processor platform 1900 capable of executing the instructions of FIGS. 4 and/or 5 to implement the apparatus of FIGS. 2 and/or 3. The processor platform 1900 can be, for example, the consumer electronics device 104, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The processor platform 1900 of the instant example includes a processor 1912. For example, the processor 1912 can be implemented by one or more microprocessors or controllers from any desired family or manufacturer.

The processor 1912 includes a local memory 1913 (e.g., a cache) and is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 also includes an interface circuit 1920. The interface circuit 1920 may be implemented by any type of interface standard, such as an Ethernet interface, a universal serial bus (USB), and/or a PCI express interface.

One or more input devices 1922 are connected to the interface circuit 1920. The input device(s) 1922 permit a user to enter data and commands into the processor 1912. The input device(s) 1922 can be implemented by, for example, a keyboard, a mouse, a touchscreen, a track-pad, a trackball, isopoint and/or a voice recognition system. The user interface 1920, input device(s) 1922 may be used to implement input functions of the user interface 230 of FIG. 2.

One or more output devices 1924 are also connected to the interface circuit 1920. The output devices 1924 can be implemented, for example, by display devices (e.g., a liquid crystal display, a cathode ray tube display (CRT), and/or speakers). The interface circuit 1920, thus, typically includes a graphics driver card. The output device(s) 1924 may be used to implement the output functions of the user interface 230 of FIG. 2.

The interface circuit 1920 also includes a communication device (e.g., the data port 204 of FIG. 2) such as a modem or network interface card to facilitate exchange of data with external computers via a network 1926 (e.g., an Ethernet connection, a digital subscriber line (DSL), a telephone line, coaxial cable, a cellular telephone system, etc.).

The processor platform 1900 also includes one or more mass storage devices 1928 for storing software and data. Examples of such mass storage devices 1928 include floppy disk drives, hard drive disks, compact disk drives and digital versatile disk (DVD) drives. The mass storage device 1928 may implement the program database 250.

The coded instructions 1932, which may implement the coded instructions 400, 500 of FIGS. 4 and/or 5, may be stored in the mass storage device 1928, in the volatile memory 1914, in the non-volatile memory 1916, and/or on a removable storage disk such as a CD or DVD.

From the foregoing, it will appreciate that the example methods, apparatus and articles of manufacture have been disclosed to identify media exposed (e.g., visually, aurally, or electromagnetically) to a consumer electronics device and to generate a custom electronic program guide for the user based on the identified media.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
    collecting identifying information associated with media exposure using at least one of a microphone, a camera, or an optical sensor of a first device associated with a user;
    determining a geographic location at which the identifying information was collected during the media exposure;
    comparing the geographic location with a designated geographic area;
    in response to determining that the geographic location of the media exposure is within the designated geographic area, using the collected identifying information to generate a custom electronic program guide for the user associated with the first device; and
    in response to determining that the geographic location of the media exposure is outside the designated geographic area, refraining from using the collected identifying information to at least one of generate or update the custom electronic program guide absent user authorization.

2. A method according to claim 1, further including retrieving program information associated with the identifying information from a database and displaying the program information to the user.

3. A method according to claim 2, further including prompting the user to authorize use of the identifying information to generate the custom electronic program guide.

4. A method according to claim 3, further including generating the custom electronic program guide with program information associated with the identifying information.

5. A method according to claim 3, wherein the user is prompted to authorize use of the identifying information when the geographic location is outside of the designated geographic area but is not prompted to authorize the use of the identifying information when the geographic location is within the designated geographic area.

6. A method according to claim 1, further including cross-referencing the identifying information with program information stored in a database and generating the custom electronic program guide to include the program information.

7. A method according to claim 1, further including comparing a length of time during which the identifying information was collected to a time period threshold stored in a database to determine whether the identifying information is to be used to generate the custom electronic program guide.

8. A method according to claim 1, further including displaying program information on a user interface associated with the first device, the program information including at least one of a program name, channel information, character information, timing information, or program description information.

9. A method according to claim 2, further including:
    displaying user appointment information associated with a user of the first device in a calendar view of the custom electronic program guide; and
    displaying the program information in the calendar view to indicate timing conflicts between one or more user appointments associated with the appointment information and one or more programs associated with the program information.

10. A method according to claim 1, further including instructing a second device in communication with the first device to present a program associated with the identifying information when the program is selected by a user on the first device.

11. A first device comprising:
a collector to collect identifying information associated with media exposure presented on a second device;
a monitor to determine a geographic location at which the identifying information was collected during the media exposure; and
a selector to determine that the collected identifying information is to be used in generating a custom electronic program guide when the geographic location is in a designated geographic area and to determine that the collected identifying information is not to be used in generating the custom electronic program guide when the geographic location is outside of the designated geographic area.

12. A first device according to claim 11, further including a program guide generator to generate the custom electronic program guide with program information associated with the identifying information when the selector determines that the collected identifying information is to be used in generating the custom electronic program guide.

13. A first device according to claim 11, further including a user interface and a controller to prompt the user via the user interface to authorize use of the identifying information in generating the custom electronic program guide.

14. A first device according to claim 11, further including:
a controller to cross-reference the identifying information with program information stored in a database; and
a program guide generator to generate the custom electronic program guide to include the program information.

15. A first device according to claim 11, wherein the database is located in at least one of the first device or a central facility.

16. A first device according to claim 11, further including a graphical user interface to display user appointment information associated with a user of the first device in a calendar view of the custom electronic program guide and to display the program information in the calendar view to indicate timing conflicts between one or more user appointments associated with the appointment information and one or more programs associated with the program information.

17. A first device according to claim 11, further including a controller to instruct the second device in communication with the first device to present a program associated with the identifying information on the second device when the program is selected by a user on the first device.

18. A tangible computer readable storage medium comprising instructions that, when executed, cause a first device to at least:
collect identifying information associated with media exposure;
determine a geographic location at which the identifying information was collected during the media exposure;
compare the geographic location with a designated geographic area;
generate a custom electronic program guide for a user associated with the first device based on the collected identifying information when the geographic area is located within the designated geographic area; and
refrain from updating the custom electronic program guide based on the collected identifying information when the geographic location is located outside the designated geographic area.

19. A storage medium according to claim 18, wherein the instructions further cause the first device to prompt the user to authorize use of the identifying information to generate the custom electronic program guide.

20. A storage medium according to claim 19, wherein the instructions further cause the first device to generate the custom electronic program guide with program information associated with the identifying information.

21. A storage medium according to claim 18, wherein the instructions further cause the first device to cross-reference the identifying information with program information stored in a database and to generate the custom electronic program guide to include the program information.

22. A storage medium according to claim 18, wherein the instructions further cause the first device to compare:
a length of time during which the identifying information was collected to a time period threshold stored in a database to determine whether the identified program is to be included in the custom electronic program guide.

23. A storage medium according to claim 18, wherein the instructions further cause the first device to display user appointment information associated with a user of the first device in a calendar view of the custom electronic program guide and to display the program information in the calendar view to indicate timing conflicts between one or more user appointments associated with the appointment information and one or more programs associated with the program information.

24. A storage medium according to claim 23, wherein the instructions further cause the first device to instruct a second device to record the program when a timing conflict exists.

25. A storage medium according to claim 18, wherein the instructions further cause the first device to instruct a second device to present a program associated with the identifying information when the program is selected by a user on the first device.

26. A method according to claim 2, wherein the program information is at least one of a program name, a program description, a program schedule, or a list of similar programs.

27. A method according to claim 2, wherein the database is located in at least one of the first device or a central facility.

28. A method according to claim 9, further including recording the one or more programs when a timing conflict exists.

29. A first device according to claim 13, wherein the controller is to retrieve program information associated with the identifying information from a database and to display the program information to a user via the user interface.

30. A first device according to claim 13, wherein the controller is to prompt a user to authorize use of the identifying information when the geographic location is outside of the designated geographic area.

31. A first device according to claim 14, wherein the program information is at least one of a program name, a program description, a program schedule, or a list of similar programs.

32. A first device according to claim 11, wherein the selector is to further compare a length of time during which the identifying information was collected to a time period threshold stored in a database to determine whether the collected identifying information is to be used in generating the custom electronic program guide.

33. A first device according to claim 11, further including a user interface to display program information while the collector collects the identifying information, the program information including at least one of a program name, channel information, character information, timing information, or program description information.

34. A first device according to claim 16, further including a controller to instruct a media presentation device to record the one or more programs when a timing conflict exists.

35. A storage medium according to claim 18, wherein the instructions further cause the first device to retrieve program information associated with the identifying information from a database and display the program information to the user.

36. A storage medium according to claim 18, wherein the instructions further cause the first device to prompt the user to authorize use of the identifying information to generate the custom electronic program guide when the geographic location is outside of a designated geographic area, and to not prompt the user to authorize the use of the identifying information to generate the custom electronic program guide when the geographic location is within the designated geographic area.

37. A storage medium according to claim 35, wherein the program information is at least one of a program name, a program description, a program schedule, or program information of similar programs.

38. A storage medium according to claim 35, wherein the database is located in at least one of the first device or a central facility.

39. A storage medium according to claim 18, wherein the instructions further cause the first device to display program information on a user interface associated with the first device, the program information including at least one of a program name, channel information, character information, timing information, or program description information.

* * * * *

UNITED STATES PATENT AND TRADEMARK OFFICE
CERTIFICATE OF CORRECTION

PATENT NO. : 9,215,489 B2
APPLICATION NO. : 13/691302
DATED : December 15, 2015
INVENTOR(S) : Maini Williams et al.

Page 1 of 1

It is certified that error appears in the above-identified patent and that said Letters Patent is hereby corrected as shown below:

IN THE CLAIMS

Column 31, line 34, in claim 15, delete the claim reference number "11" and insert --14--

Signed and Sealed this
Fifth Day of April, 2016

Michelle K. Lee
*Director of the United States Patent and Trademark Office*